United States Patent [19]
Walt et al.

[11] Patent Number: 5,633,972
[45] Date of Patent: May 27, 1997

[54] SUPERRESOLUTION IMAGING FIBER FOR SUBWAVELENGTH LIGHT ENERGY GENERATION AND NEAR-FIELD OPTICAL MICROSCOPY

[75] Inventors: David R. Walt, Lexington; Paul Pantano, Everett, both of Mass.

[73] Assignee: Trustees of Tufts College, Medford, Mass.

[21] Appl. No.: 564,488

[22] Filed: Nov. 29, 1995

[51] Int. Cl.⁶ .................................................. G02B 6/06
[52] U.S. Cl. ........................... 385/116; 385/128; 385/147
[58] Field of Search .......................... 385/115–121, 901, 385/43, 126, 127, 128, 147

[56] References Cited

U.S. PATENT DOCUMENTS

| | | | |
|---|---|---|---|
| 4,978,186 | 12/1990 | Mori | 385/901 |
| 5,058,985 | 10/1991 | Davenport et al. | 385/115 |
| 5,513,291 | 4/1996 | Buchin et al. | 385/117 |

*Primary Examiner*—John Ngo
*Attorney, Agent, or Firm*—David Prashker

[57] ABSTRACT

The present invention provides a superresolution imaging fiber for generating a plurality of subwavelength light energy beams concurrently and for near-field viewing. The imaging fiber comprises a unitary fiber optic array of fixed configuration and dimensions comprising typically from 1,000 to 100,000 optical fiber strands which terminate at one array end as tapered strand end faces limited in size to a range from about 2–1,000 nanometers in diameter. Overlying these tapered strand end faces is a thin opaque metal coating having a size-limited end aperture ranging from about 2 to less than about 1,000 nanometers in diameter. These size-limited end aperatures provide for the generation of a plurality of discrete subwavelength light beams concurrently.

11 Claims, 16 Drawing Sheets

SUPERRESOLUTION IMAGING FIBER FOR SUBWAVELENGTH LIGHT ENERGY GENERATION AND NEAR-FIELD OPTICAL MICROSCOPY

FIELD OF THE INVENTION

The present invention is concerned generally with the generation of optical instruments and microscopes that bypass the limitation of lens-based optical microscopy which is limited in resolution to no better than one-half of the wavelength of the light being used; and is specifically directed to the development of near-field imaging fibers which allow wavelength-independent optical imaging and the examination of samples without being limited by the diffraction properties of electromagnetic radiation.

BACKGROUND OF THE INVENTION

The ever-increasing interest in microanalysis, especially in the fields of cell biology, electronics, and materials science, have demanded specialized techniques which must provide both high spatial resolution and high sensitivity. The currently available techniques fall into two broad classes: the first involves the use of shorter wavelength radiation such as in electron or x-ray microscopy [D. F. Parsons, editor, *Short Wavelength Microscopy*, New York Academy of Sciences, New York 1978; D. Sayer, editor, *X-ray Microscopy II Proceedings of the Second International Symposium*, Springer-Verlag, New York, 1988]. The second class includes the various forms of scanning probe microscopy which include scanning tunneling microscopy (STM) as the best-known example [H. K. Wickramasinghe, editor, *Scanned Probe Microscopy*, American Institute of Physics, New York, 1992; Binning et al., *Phys. Rev. Lett.* 49: 57 (1982)]. Unfortunately, however, most of these techniques either involve radiation that is destructive to the sample itself or requires test circumstances that are not environmental conditions or are not ambient conditions in which the sample is found.

In contrast and contradistinction, microanalytical techniques, such as optical microscopy, provide the highly desirable and attractive features of low cost, high speed, reliability, versatility, accessibility, ease of use, and information contrast. Equally important, optical microscopy in the visible region of the spectrum is generally regarded as the most benign kind of electromagnetic radiation. In addition, optical microscopy does not require the sample to be subjected to vacuum; does not utilize sample-destructive electron beams as is the case with scanning electron microscopy; and is not limited to the use of conductive samples as is the case with scanning tunneling microscopy. Moreover, optical techniques can be interfaced with a wide variety of selective absorption and fluorescence probes such that many molecules and cellular structures can be observed. Unfortunately, the usual problem with visible light and optical microscopy is the limitation imposed by focusing with a lens; and resolution is thus the primary limitation of lens-based optical microscopy.

The resolution of all lens-based instruments is defined by the finite dimensions of a lens. The resolving power, or the minimum separation between two points which can be resolved ($d_{min}$), can be approximated by the following equation: $d_{min} \sim \lambda/2$ where $\lambda$ is the wavelength of light. This limitation is the result of diffraction that takes place in the microscope because of the wave nature of light. Moreover, it should be noted that the resolution limit described above arises from the assumption that the image of an object is being detected in the "Far-Field", that is, a distance which is much greater than the wavelength of light employed (e.g., the wavelength of green light is ca. 500 nm). For these reasons, where the optical microscopy is so limited in resolution to no better than one-half of the wavelength of light being used ($\lambda/2$), such microscopy is termed "far-field" imaging or viewing.

An increasingly important and rapidly developing alternative to conventional lens-based optical microscopy is the "near-field" or lensless technique which provides superresolution imaging and spectroscopy. The term "superresolution" defines any means for optical imaging or spectroscopy that permits spatial resolution which exceeds the diffraction limitation caused by the wave nature of light; and provides a resolution which is greater than one-half the wavelength of the light actually being used. All superresolution near-field imaging and near-field scanning optical microscopy ("NSOM") is based on the fact that although light cannot be focused to a spot less than one-half the wavelength of light ($\lambda/2$), it can be directed through a device or article which reduces the size of the light energy to dimensions smaller than $\lambda/2$. A variety of size reducing probe articles have been proposed and apply to near-field imaging and to near-field scanning optical microscopy. These have come in three essential categories: devices that utilize apertures [Betzig, E. and J. K. Trautman, *Science*. 257: 189–195 (1992); Betzig et. al., *Science* 251: 1468 (1991); Lewis et al, *Ultramicroscopy* 13: 227 (1984); Pohl, et al., *App. Phys. Lett.* 44: 651 (1984); Betzig, et al., *Biophys. J.* 49: 269 (1986)]; those devices involving near-field scattering mechanisms [Pohl, et al., *Proc. Soc. Photo-opt. Instru. Eng.* 897: 94 (1988); Fischer, et al., *Phys. Rev. Lett.* 62: 458 (1989); Reddick, et al., *Phys. Rev. B.* 39: 767 (1989)]; and those methods dependent upon luminescence effects [Lieberman et al., *Science* 247: 59 (1990); Lewis, A and K. Lieherman, *Nature* 354: 214 (1991); U.S. Pat. No. 5,105,605].

The basic principle of near-field viewing and imaging is best illustrated by the aperture technique as is illustrated by prior art FIG. A. When light is directed through a sub-$\lambda$-sized hole, the portion of energy that passes through the hole will at first be confined to the dimensions of the aperture. The exiting light being of subwavelength dimensions will then rapidly diffract in all directions; however, there will be a distinct region in the vicinity of the aperture called the "near-field" where the existing light beam retains the approximate dimensions of the hole. If this subwavelength light beam within the near-field region is used to raster scan the surface of an object, a two-dimensional image can be created in a serial fashion (one point at a time). Resolution far less than the conventional lens-based limit of about 200 nanometers (nm) is easily achieved; and frequently resolution on the order of 15–50 nanometers can be achieved using the NSOM technique.

It will be recognized and appreciated that the essential concept of superresolution near-field imaging was presented more than sixty years ago by E. H. Synge [*Phil. Mag.* 6: 356 (1928)]; regenerated about 40 years ago by J. A. O'Keefe [*J. Opt. Soc. Am.* 15: 359 (1956)]; and only validated in 1972 by an experiment which obtained $\lambda/60$ resolution by passing microwaves through a small aperture and scanning it over a surface [Ash, E. A. and G. Nicholls, *Nature* 237: 510 (1972)]. The near-field superresolution technique remained only of passing interest for some years thereafter [Lewis et al., *Biophys. J.* 11: 405a (1983); Lewis et al., *Ultramicroscopy* 13: 227 (1984); Pohl et al., *Appl. Phys, Lett.* 11: 651 (1984)]. It is only been in the last few years that near-field imaging and NSOM has become of primary interest as an alternative technique in optical microscopy [Lieberman et al., *Science* 247: 59 (1990); Kopelman et al., *Microbeam Analysis*, D. G. Howitt, editor, San Francisco Press Inc., 1991; Lewis, A. and K. Lieberman, *Anal. Chem.* 63: 625A (1991); Betzig, E. and J. K. Trautman, *Science* 257: 189 (1992); Harris et al., *Applied Spectroscopy* 48: 14A (1994); and the references cited within each of these individual publications].

The most favored approach to date for near-field imaging and NSOM has been the use of apertures and the development of aperture-containing probes which will overcome the technological difficulties imposed by the NSOM approach. It is recognized that the chief difficulty in near-field imaging and the NSOM technique lies primarily in the fabrication of a suitable aperture; and in the ability to position the aperture accurately near the surface of the object to be imaged and yet be close enough to the surface of the object that the subwavelength light beam remains collimated. The entire near-field region typically extends no further than the dimensions of the subwavelength aperture itself. Accordingly, to maintain consistency of light beam size and intensity of light energy, the actual distance between the surface of the object and the subwavelength-aperture must be held constant to within a few percent of the entire near-field region itself.

Several different kinds of subwavelength aperture-containing probes or articles have been developed and reported in the scientific literature. A first instance has taken the form of metal-coated glass micropipettes [Harootunian et al, *Appl. Phys. Lett.* 19: 674 (1986)]. These micropipettes were produced by heating and pulling apart small glass capillaries to yield an inner aperture diameter in the range of between 500–1000 Angstroms (A). The heat-pulled glass capillaries are then evaporation coated along the outside of the glass micropipette with a thin film of metal such as aluminum or chrome—thereby making the exterior surface completely opaque. Typically thereafter, a small optical fiber strand is inserted into the interior lumen of the coated glass pipette up to the very tip near the aperture; and a laser beam of light is fed into the pipette interior via the optical fiber. As a consequence, a tiny beam of light energy emerges from the uncoated hole at the tip of the micropipette. In this manner, a controlled subwavelength beam of light energy emanating from the tapered micropipette can be employed for near-field scanning optical microscopy [Betzig, E. and J. K. Trautman, *Science* 257: 189 (1992) and the references cited therein].

Another instance of the aperture technique is the use of a clear optical fiber tapered adiabatically to a tiny tip and subsequently coated with aluminum [Betzig et al., *Science* 251: 1468 (1991)]. Using this subwavelength apertured probe in combination with a light beam from an argon ion laser through an 80 nanometer aperture, near-field images with λ/43 resolution were obtained.

A third instance of aperture probes utilizes crystals of anthracene, dichloromethane, and tetracene to transform the aperture point from a passive source of subwavelength light into an active emitter of light. These articles employ the submicron tip of a metal-coated glass micropipette whose interior is filled with the molecular crystal. Incoming light photons propagate through the submicrometer portion of the pipette and become absorbed by the crystal. The crystal then actively emits the light beam through the aperture for near-field imaging [Kopelman et al., *Microbeam Analysis* (D. G. Howitt, editor), San Francisco Press, Inc., 1991].

A fourth instance utilizes a flat aperture consisting of a glass slide covered with a thick aluminum film containing small subwavelength dimension holes formed by metal-shadowing small latex spheres. [Fischer, U. Ch., *J. Vac. Sci. Technol.* B3: 3861 (1985)]. The problem of positioning the flat aperture probe in relation to the surface of a sample was resolved by placing a flat sample on the top of a spherical glass surface.

Despite these many recent developments and innovations reported in the scientific literature, near-field imaging and near-field scanning optical microscopy remains a difficult and burdensome technique in practice. Each of the presently known aperture devices for producing subwavelength light energy yields only a single beam of light; must carefully position the single beam of light in a carefully controlled fixed relationship to the surface of the object to be imaged; and provides images which are extremely limited both in the size of the field of view as well as the quality of the image actually seen. Moreover, to employ the NSOM technique, a long period of carefully controlled raster scanning must be performed using only the single beam of light which must then travel repeatedly over large areas of sample to provide even a single image. Thus, present practical techniques of NSOM and near-field imaging as such are highly laborious, time consuming, technically stringent and demanding, and provide only single points of information which then must be carefully matched with many other individual points in order to obtain a comprehensive picture of the sample which then may be reviewed for microanalytical purposes. Accordingly, were an aperture-based optic fiber developed which would provide superresolution capabilities with a plurality of discrete subwavelength beams of light used concurrently and collectively to be developed, such an innovation would be recognized as a major advance and unexpected improvement over conventionally known light probes and near-field imaging techniques.

SUMMARY OF THE INVENTION

The present invention provides a superresolution imaging fiber comprising:

a preformed, unitary fiber optic array of predetermined configuration and dimensions comprised of a plurality of optical fiber strands disposed co-axially along their lengths and having two discrete optic array ends each formed of multiple optical fiber strand ends and strand end faces, wherein (a) the first of said discrete optic array ends is formed of multiple optical fiber strand ends which collectively present a non-tapered optic array end surface for the introduction and conveyance of light energy, and (b) the second of said discrete optic array ends is formed of tapered multiple optical fiber strand ends of reduced thickness each of which presents a tapered strand end face limited in size to a range from about 2 nanometers to about 1,000 nanometers in diameter, said tapered multiple strand end faces collectively presenting a tapered optic array end surface; and an opaque metal coating covering said second tapered optic array end surface and overlaying said tapered multiple optical fiber strand end faces as a plurality of open-ended metal tubes each having a size-limited end aperture ranging from about 2 nanometers to less than about 1,000 nanometers in diameter.

BRIEF DESCRIPTION OF THE FIGURES

The present invention can be more easily understood and better appreciated when taken in conjunction with the accompanying drawing, in which.

Prior art

DETAILED DESCRIPTION OF THE INVENTION

Figure 1:
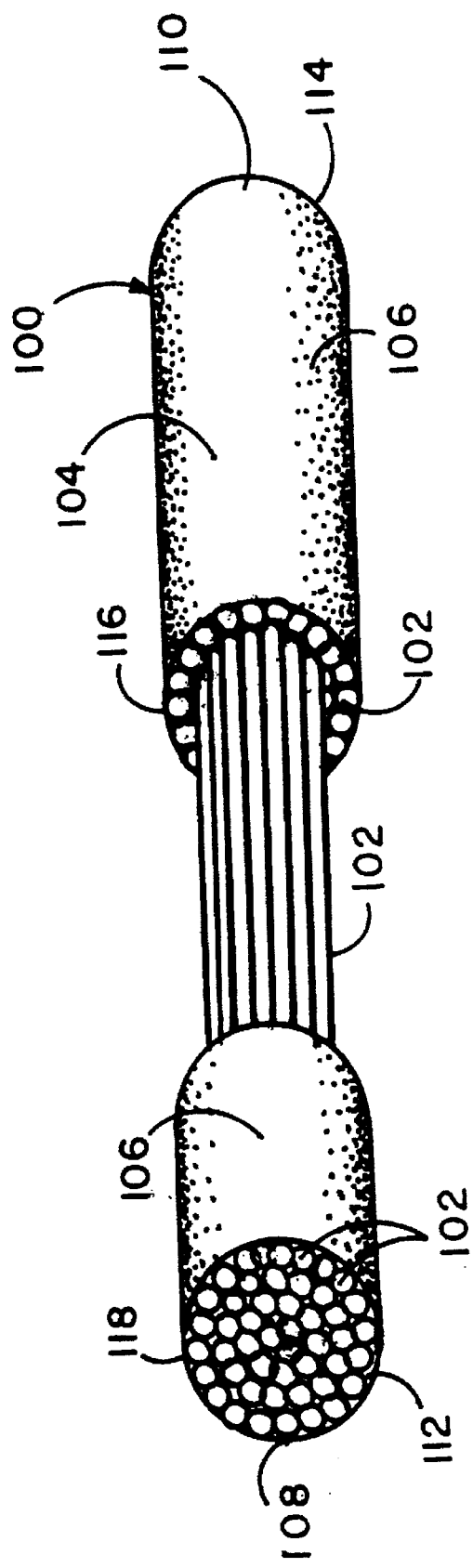
FIG. 1 is a cut-away overhead view of a conventionally known unitary fiber optic array which serves as the initial workpiece for manufacturing the present invention.
Figure 1A:
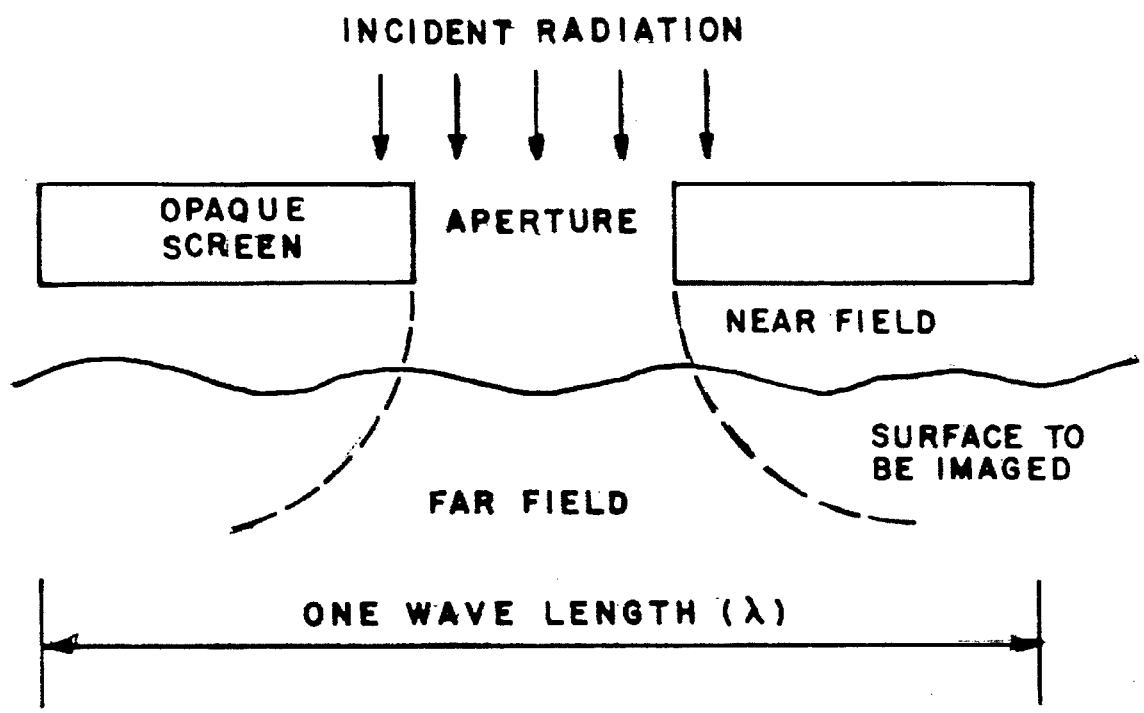
FIG. 1A is a schematic representation of the near-field diffraction from a subwavelength aperture in a conducting medium.

The present invention is an unique improvement in the construction and manufacture of imaging fibers which generate a plurality of discrete subwavelength light energy beams concurrently and provide superresolution capability suitable for nearfield viewing. While the format and organization of the present superresolution imaging fiber may have a superficial similarity to the imaging optical probes previously reported in the scientific and/or commercial literature and/or those which are currently used for near-field optical microscopy, the present invention provides greatly enhanced capabilities and unexpectedly superior attributes which separate and distinguish the invention from all its predecessors. Among the unusual capabilities and distinct advantages provided by the present invention are the following.

1. The present invention is an aperture-based imaging fiber able to generate a plurality of discrete subwavelength light beams concurrently, each of the light energy beams having a restricted diameter ranging from about 2 nanometers to less than about 1,000 nanometers in size. Equally important, the number of individual subwavelength light beams generated will correspond directly with the actual number of optical fiber strands comprising the imaging fiber array bundle itself. Since a conventional optic fiber array commonly comprises from about 1,000 to about 100,000 individual strands, the number of subwavelength light beams generated will correspondingly lie in the range from about 1,000 to about 100,000 in number. The ability to generate such a huge number of discrete subwavelength light beams concurrently represents an exponential increase and capability in comparison to the single optical fiber probes employed conventionally in this art.

2. The present invention provides near-field viewing and imaging using a plurality of discrete subwavelength beams of light concurrently to form a multiple-point picture or image. As will be noted and appreciated hereinafter, the center-to-center distances between individual optical fiber strands in the array are consistently maintained and typically is a distance of about 2–5 micrometers. Depending upon whether the strand end face is mildly or sharply pulled and heated, the distance between the individual and discrete strand end faces and the subwavelength beams of light will be separated by 0.5–2.0 micrometers at most. In this manner therefore, not only are the individual and discrete subwavelength beams of light generated concurrently and substantially parallel to one another, the distance between each aligned and discrete subwavelength of light to the next always is in the order of only a few micrometers at most. In this manner, the plurality of discrete subwavelength beams of light collectively generate many individual points of illumination and imaging of closely adjacent areas within the sample being examined in the near-field.

3. The availability not only of many discrete subwavelength beams of light and closely spaced individual subwavelength beams in alignment together allow the user to examine the surface of a sample held in the near-field environment far more quickly and thoroughly than is possible using conventional known articles and apparatus. While the conventional art teaches and necessitates the use of vigorous raster scanning of a single point of light in order to generate a picture or image of the specimen using electronically enhancing means, the present invention markedly and substantially reduces the labor, time, and effort required to obtain a complete picture or image of the surface of the specimen lying in the near-field environment. Not only has the labor, time and effort required for near-field viewing and imaging been greatly diminished, but the quality of the image itself obtained using the present invention and many individual subwavelength light beams concurrently will thus provide a far more accurate and reproducible image of the specimen's surface than was possible previously using conventional apparatus due to reduced acquisition time.

Since the present invention can be constructed differently and in alternative formats as well as be employed for a variety of divergent purposes and applications, the subject matter as a whole which is the present invention will be presented and described as an initial workpiece which is then altered and modified in order to create the essential features and requirements characterizing the invention. Moreover, this mode of detailed disclosure is employed in order that the prospective user may more quickly recognize and appreciate the major differences and distinctions of the present invention in comparison to the fiber optic articles and systems conventionally known.

I. The Initial Workpiece: The Preformed, Unitary Fiber Optic Array

Figure 2:
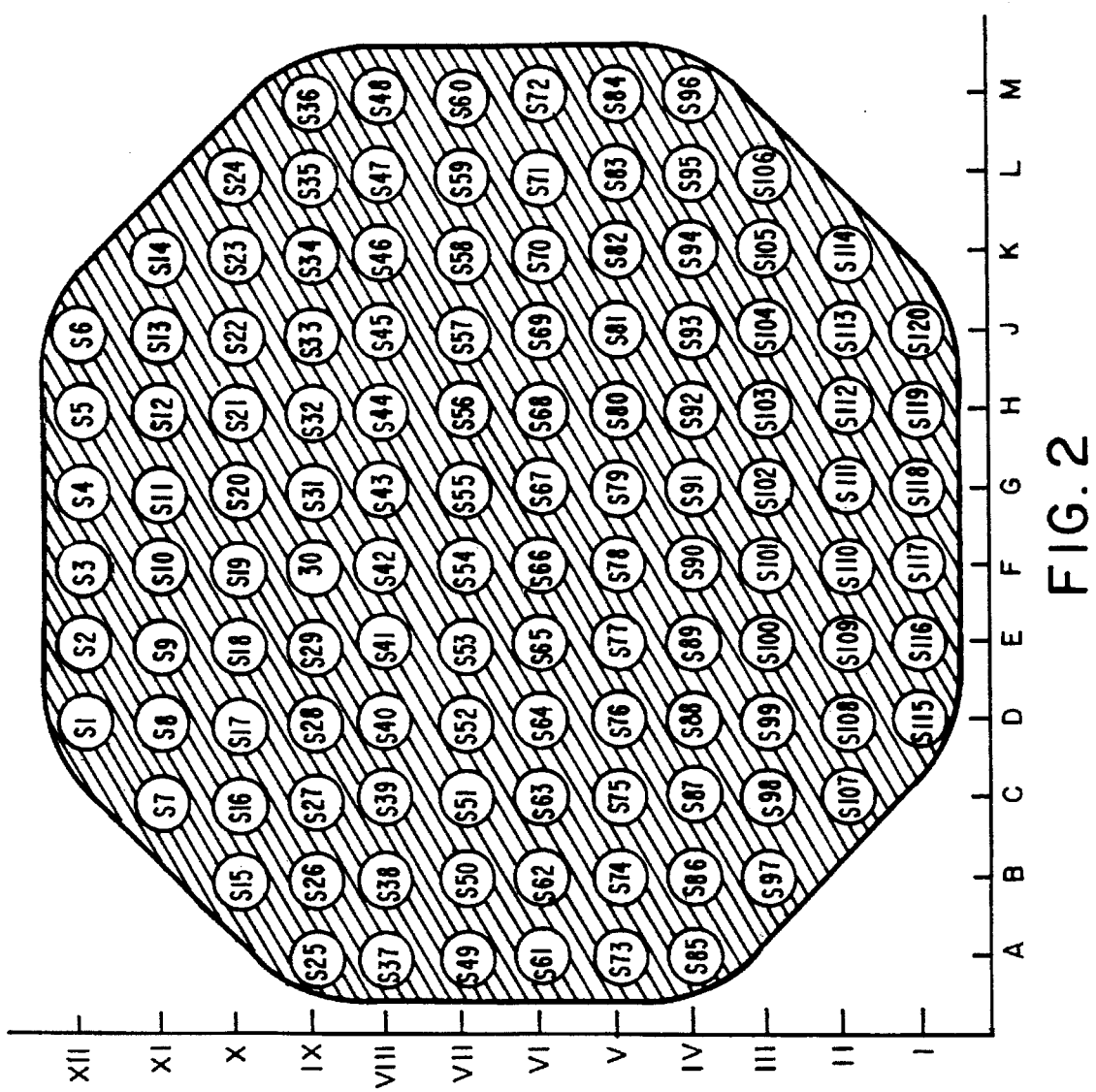
FIG. 2 is a magnified and simplified view of the "proximal" optic array end surface for the fiber optic array of FIG. 1.
Figure 3:
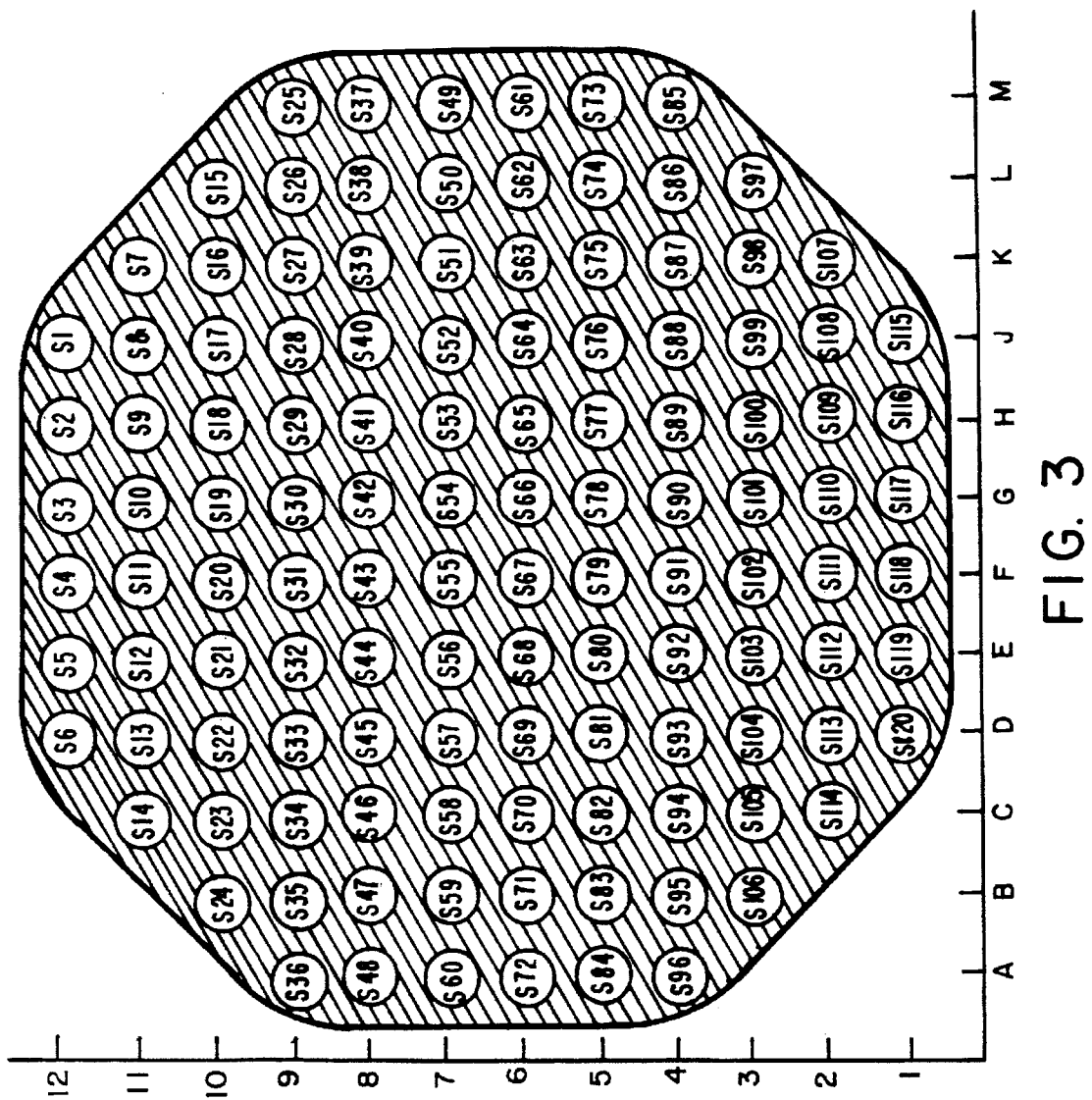
FIG. 3 is a magnified and simplified view of the "distal" optic array end surface for the fiber optic array of FIG. 1.

The unique fiber optic array, its organization and construction, and its component parts are illustrated by FIGS. 1–3, respectively. Each discrete, unitary fiber optic array is a preformed bundle comprised of a plurality of individually clad, fiber optical strands disposed coaxially along their lengths and has a predetermined overall array configuration and dimensions. The smallest common repeating unit within the preformed array is thus a single fiber optical strand. A typical imaging fiber is comprised of between 1,000 and 100,000 individually-clad optical fiber strands in which the diameter of each fiber strand disposed within the bundle is on the order of 2–100 micrometers. The manner in which these optical fiber strands are prepared and the manner in which these multiple optical fibers strands are joined collectively into an organized optic array are conventionally known, but are fundamental to and requisite for a proper understanding and use of the construction and format for the imaging fiber.

A conventional fiber optic array is illustrated by FIGS. 1–3, respectively. The unitary fiber optical array 100 appears in an exaggerated, highly magnified and simplified view without regard to scale within FIG. 1. The preformed array is composed of a plurality of individually clad, fiber optical strands 102 which collectively lie co-axially along their respective lengths as the discrete, unitary optic array 104 of fixed and determinable configuration and dimensions.

The construction, organization and positional alignment within a typical fiber optical unitary array is revealed in FIGS. 1–3. For descriptive purposes only, each of the individually clad, optical fiber strands 102 is presumed to be linearly straight in position and has been arbitrarily assigned an identifying number S1–S120 as illustrated by FIGS. 2 and 3. The intended proximal optic array surface 112 of FIG. 2 shows that each of the individual fiber optical strands S1–S120 can be identified and distinguished from its adjacent disposed neighbor as well as from any other optical fiber strand within the preformed array 104 by a set of spatial positioning coordinate numbers for the strand end faces. The intended proximal optic array surface 112 may thus be arbitrarily divided into two axial coordinate directions as is illustrated by FIG. 2. The exact location of the S1 strand is thus identifiable by the numerical coordinates "XII D" showing the strand end face. Similarly, the exact spatial positioning and strand end face of the S71 fiber is designatable as "VIL". In this manner, the individual spatial position and strand end faces for each optical fiber strand S1–S120 is thus completely locatable and identifiable using the coordinate numeral labeling system.

The other optical array surface 114 (the intended distal surface) allows for a similar mode of identification (presuming straight linear alignment of strands) by spatial positioning of each individual optical strand-again as a result of dualaxis numerical coordinates as seen in FIG. 3. Accordingly, fiber and strand end face S1 is located at numerical position "12j", and fiber S71 is identifiable, locatable, and distinguishable from all other fibers at the optic array surface by its individual numeral coordinates "6b". In this manner, the precise and exact position of each individually clad optical fiber strand and strand end faces on each of the discrete optic array surfaces 112, 114 can be located, identified, and specified via a series of two different numerical coordinates. The intended proximal and distal optic array surfaces am thus completely identifiable and distinguishable as per individual fiber optical strand 102 despite its presence in the preformed collective body 106 of the unitary fiber optical array 100.

It will be recognized and appreciated also that the preformed overall organization of the individually clad, optical fiber strands 102 within the unitary array 100 is as aligned, parallel, strands which maintain its relative organizational positioning in a coherent, consistently straight manner over the entire length of the collective body 106. This is deemed to be the most desirable and most easily constructable organization scheme for the preformed optical fiber array of the present invention.

However, although this highly organized, coherent, and rigidly aligned collective construction is deemed to be most desirable, this high degree of organizational alignment is not an absolute requirement for each and every embodiment of the unitary optical array. Alternative manufacturing practices allow for a more random disposition of the individually clad, optical fiber strands disposed co-axially along their lengths. Although less desirable, a partially random disposition or a completely random alignment of the optical fiber strands will also result in a unitary collective body of optical fibers and in proximal and distal collective ends which provide two discrete optic array surfaces.

In such alternative embodiments, however, an optical fiber strand 102 whose intended proximal end would be found to be at numerical position "IIJ" of FIG. 2 could randomly present a intended distal end position designated as "3h" as shown within FIG. 3. It will be recognized therefore that while the individually clad, optical fiber strands lie adjacent one another along the entirety of their axial lengths—their position relative to one another, however, may vary in part or in whole, thereby creating a semi-coherent or an incoherent alignment which will vary in the degree of randomness to be found within their organizational construction. There is no requirement as such that the positioning of the intended proximal end of one strand be aligned and/or identical with the positioning of the intended distal end within the unitary optical array. Thus, in such randomly organized optical array constructions, therefore, the precise proximal and distal end positioning for the strand end faces would be measured and identified by passing light energy through individual optical fibers at one optic array end face and empirically determining the location of the light energy photons exiting from the other end of the same single fiber strand. Although far more laborious and inconvenient, by performing this extra step of empirically coordinating the proximal and distal ends of each individual optical fiber strand in the unitary array, an analogous exact set of numerical coordinates identifying the precise spatial positioning of the fiber at each end of the array may be obtained.

The entirety of the construction for the unitary imaging optical fiber array (whether uniformly coherent, semi-random, or completely randomly organized) provides a means of introducing light energy photon of any determinable wavelength at one specific positioning on the designated "proximal" optic array surface; and then be able to predict accurately the spatial position of the light energy exiting from one or more specific strand ends at the "distal" optic array surface. Therefore, by using the preferred completely coherent and rigidly maintained parallel alignment of strands illustrated by FIGS. 2 and 3 (the intended proximal and distal optic array end surfaces respectively) of a unitary fiber optic array, the user may introduce light energy to a specific spatial location on the "proximal" optic array surface 112—for example, only to fibers S1, S7 and S8—and have accurate knowledge and confidence that the light energy would be conveyed only by those three optical fiber strands and exit only the strand end faces at numerical positions "12j", "11j", and "11K" alone or the "distal" optic array surface 114. No other light energy would appear from any other fiber strand or spatial position at the optic array surface 114. Similarly, were light energy of specific wavelengths introduced at the "proximal" optic array surface 112 via optical fibers S107, S108, and S115 respectively, the user can accurately predict and identify that the light energy will be conveyed by only these three optical fibers; and will exit as light beams only at the "distal" optic array surface 114 at strand numerical coordinate position numbers "2k", "2j", and "1j"respectively; and from no other strand end faces or spatial positions on this "distal" optic array surface. In this manner, not only does one have knowledge of the individual spatial positioning of each optical fiber strand in the preformed array but also has the ability to identify and precisely locate light energy photons emerging from individual optical fiber strands within the whole of the optic array surface in a practical and reliable mode.

II. Tapering The Second Optic Array End Of The Preformed, Unitary Fiber Optic Array Given the existence and availability of the preformed unitary fiber optic array, it is essential and required that the designated "distal" or second discrete optic array end be tapered and reduced in thickness such that each optical fiber strand end becomes tapered individually and presents a tapered strand end face limited in size to a range from about 2 nanometers to about 1,000 nanometers in diameter. These tapered multiple strand end faces will therefore collectively present a tapered optic array end surface for the conveyance and discharge of multiple light energy beams concurrently.

A choice and variety of different tapering methods and techniques are available in order to achieve the desired end result and product of a "distal" optic array end which is tapered, of reduced thickness, and presents individual tapered strand end faces limited in size to the range of about 2-1,000 nm in diameter. The presently available tapering methods include a fiber pulling and heating procedure or an etching procedure; the preferred method for the present invention, however, uses both the pulling/heating and etching techniques in combination. Each of these tapering procedures will be described individually in detail.

A. The Fiber Pulling and Heating Method

The preformed unitary fiber optic array of FIGS. 1 and 3 can be reduced in thickness at the designated "distal" end by simultaneously pulling and heating the strands lengths axially comprising one optic array end. Heating of the optic array end is typically and conventionally accomplished using a metal filament, or an electric arc, or a carbon-dioxide laser [Valaskovic et al., *Appl. Optics* 34: 1215–1228 (1995); McCullock, S. and D. Uttamchandani, *Meas. Sci. Tech.* 6: 1157–1162 (1995); the texts of which are expressly incorporated by reference herein].

The ability to pull and to taper fiber arrays while maintaining the architecture of the strand cores is achieved using a standard glass capillary tube pipette puller, such as the Narishige Model PE-2 [Brown, K. T. and D. G. Flaming, *Advanced Micropipette Techniques for Cell Physiology*, International Brain Research Organization, Oxford, 1986].

Figure 4:
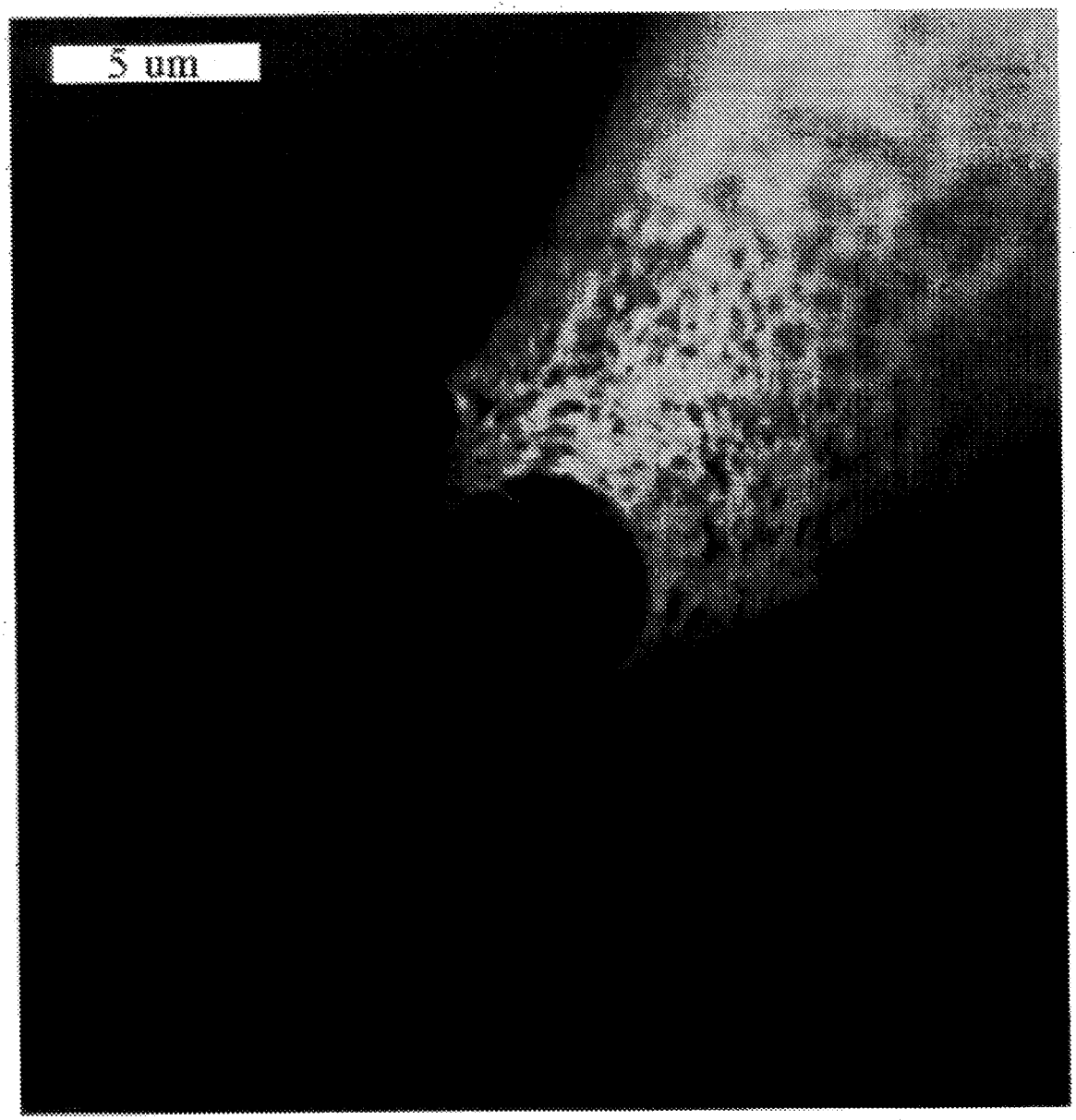
FIG. 4 is a scanning electron micrograph of an unpolished tapered distal array end of a fiber optic array.

FIG. 4 shows a scanning electron micrograph of an unpolished, tapered fiber array (Galileo Electro-Optics, Sturbridge, Mass.) where the original overall diameter of the fiber optic array was initially 1,000 µm and the final tapered tip diameter was only ~5 µm. The diameter of the tapered optic array end can be controlled by polishing; specifically, by controlling the length of the fiber length that protrudes from the polishing apparatus (where the tapered array end was first potted in epoxy to protect it during polishing).

Figure 5:
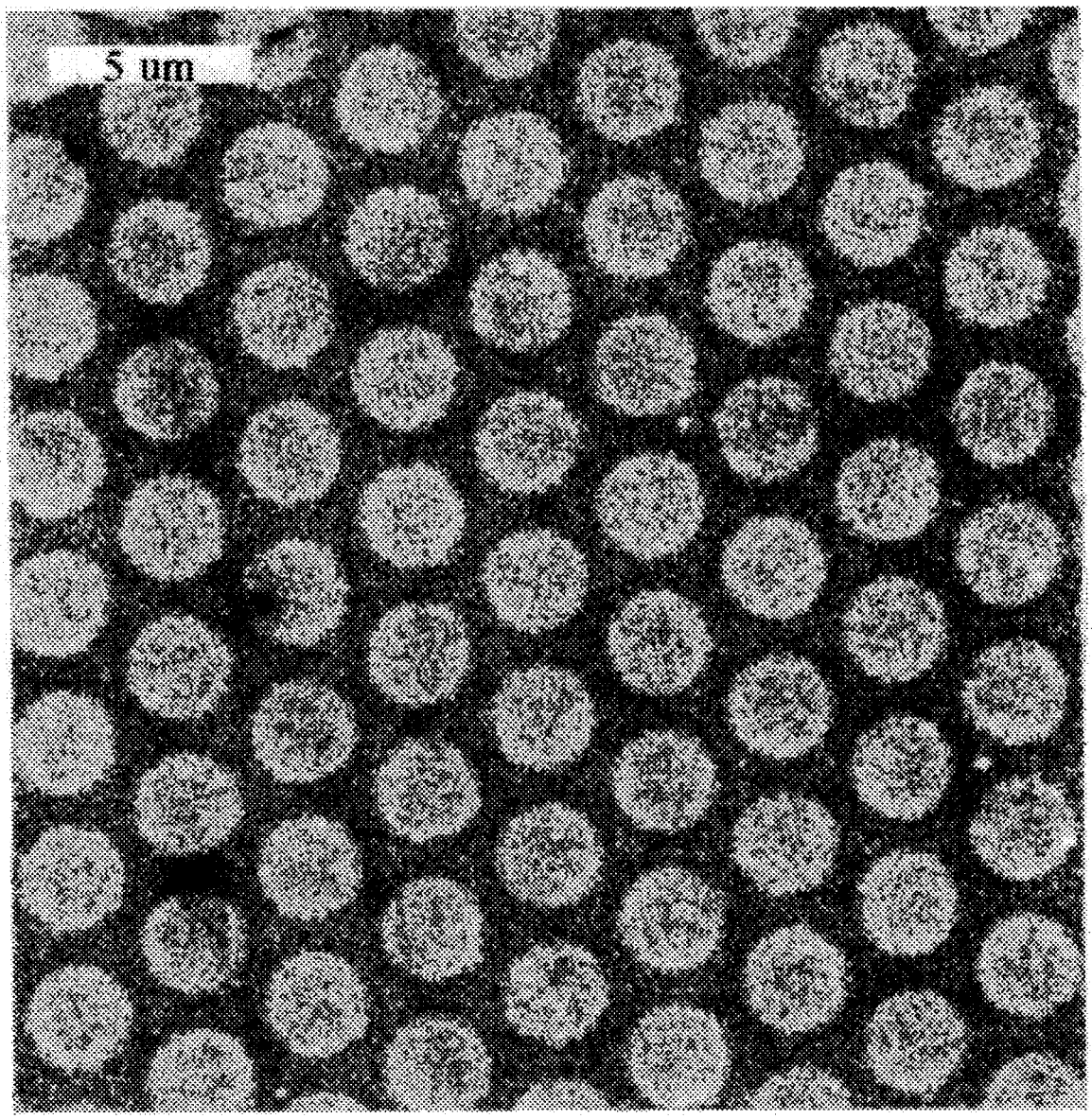
FIG. 5 is a scanning electron micrograph of a polished, non-tapered, distal array end surface where the outer diameter is about 1 mm and the optical fiber strand cores individually are about 2600 nm in diameter.
Figure 6:
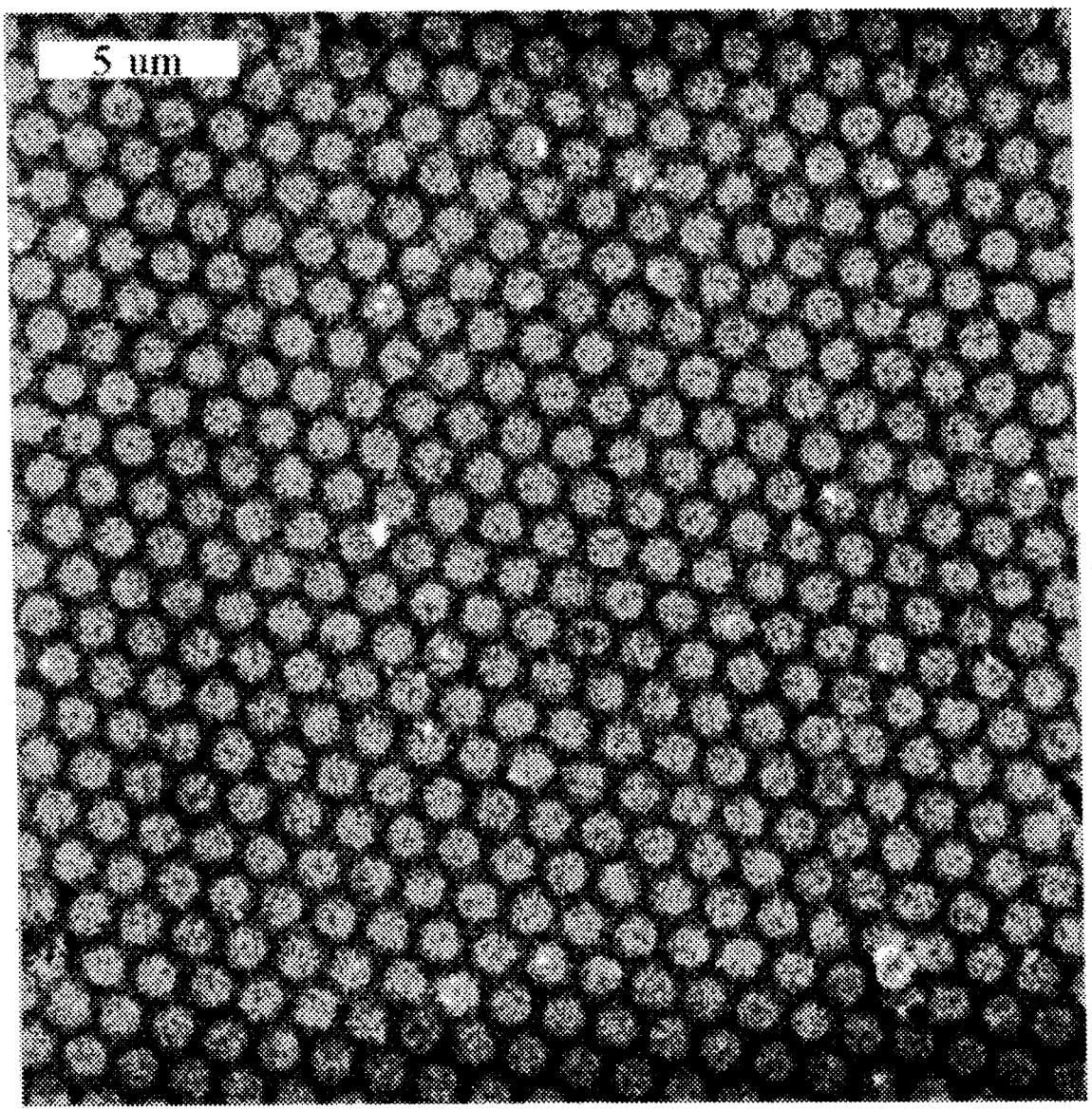
FIG. 6 is a scanning electron micrograph of a polished, tapered distal optic array end surface where the tapered outer array diameter is about 0.325 mm the tapered strand ends individually are about 900 nm in diameter.

The major changes effected by the pulling and heating technique are shown by FIGS. 5 and 6 respectively. FIG. 5 shows a scanning electron micrograph of a polished non-tapered imaging fiber where the original diameter of the imaging fiber was 1000 µm and the individual strand cores are about 2.6 µm; in comparison, FIG. 6 shows a scanning electron micrograph of a polished, tapered imaging fiber where the diameter of the tapered end face of the array was reduced to about 325 µm and the diameter of the optical fiber strand cores individually is about 900 nm. In both figures, the lighter regions are the optical fiber cores and the darker regions are the cladding material. In comparing FIGS. 5 and 6, it will be recognized and appreciated that the tapering procedure yielded not only an imaging fiber array whose tapered end tip was ~3× smaller than the original size, but also the result that the diameters of the cladded optical fiber strands comprising the imaging fiber array were also scaled back in a uniform manner by a factor of 3. Furthermore, note that the hexagonal packing architecture of the individually-cladded optical fibers within the array was not altered by or modified by the pulling and heating procedure.

It is also noteworthy that the tapered strand end faces illustrated by FIG. 5 are substantially flat-ended; remain cladded at most to the very tip of the strand end face; and provide a substantially planar tapered grid optic array end surface wherein each tapered strand end is limited in size to the range between 2–1000 nm in diameter. The physical appearance and format of this pulled and heated tapered array end stands in marked contrast to that illustrated by FIGS. 1 and 3 respectively in the initial workpiece.

B. The Fiber Etching Method

A second available means for tapering the designated "distal" fiber optic array end utilizes etching procedures to reduce the thickness of each individual optical fiber strand end and to taper the strand end face such that a sharply tapered, pointed strand end tip face is produced. Note also that selective and/or differential etching of an optical fiber strand's core versus the cladding of the strand can be achieved by exploiting either (a) the difference in chemical structure of the strand core and the cladding material, or (b) the difference in the spatial position and thickness of the strand core and the cladding material which surrounds it. For example and as explained by Pangariban et al. [*Jpn. J. Appl. Phys.* 31: L1302 (1992)], the difference in the solubility of the Si-based and Ge-based reaction products following the reaction of $SiO_2$ and $GeO_2$ with a buffered hydrofluoric acid solution leads to the difference in the etching rates between the core and cladding of the optical fiber strands comprising the unitary fiber optic array. Such selective and/or differential etching techniques will result in a faceted grid optic array end whose tapered strand end faces are individually limited in size to the range of about 2–1,000 nm in diameter; but also provides an array of sharply tapered strand end tips which are spaced from one another in parallel alignment by distance of a few micrometers at most.

Available etching procedures include wet/chemical etching techniques which utilize reactants such as hydrofluoric acid, buffered hydrofluoric reagent mixtures, strong inorganic bases such as sodium hydroxide, and other highly corrosive and/disintegrating liquids such as chromic acid and the like [Pangaribuan et .al., *Jpn. J. Appl. Phys.* 31: L1302–L1304 (1992) and the references cited therein]. Alternatively, dry etching techniques utilize and include such processes as magnetron reactive ion etching, focused ion beam milling, chemically-assisted ion beam etching, electron cyclotron etching, inductively coupled plasmas, and the like [Snider et al., , *J. Vac. Sci. Tech. B.* 12: 3327–3331 (1994); Marchman et al., *J. Vac. Sci. Tech. B.* 12: 3585–3590 (1994); and the references cited within each of these publications]. If desired, one may also employ a dual or combination wet and dry etching procedure with the aid of photolithographic masking techniques conventionally known and utilized to date.

Figure 7:
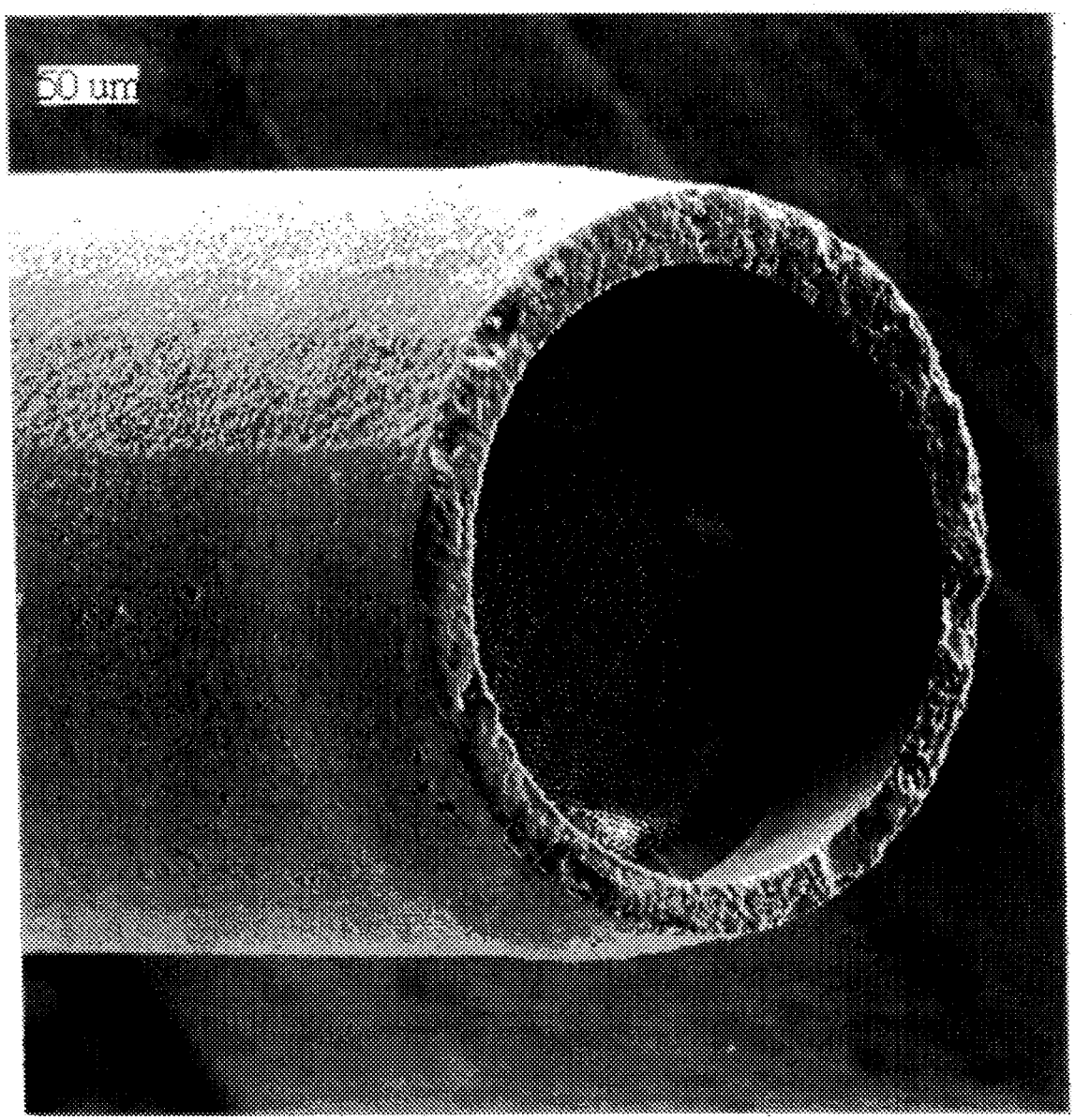
FIG. 7 is a low magnification (170×) scanning electron micrograph of the distal optic array end surface which has been chemically etched and where the silicon resin jacket has not been removed.
Figure 8:
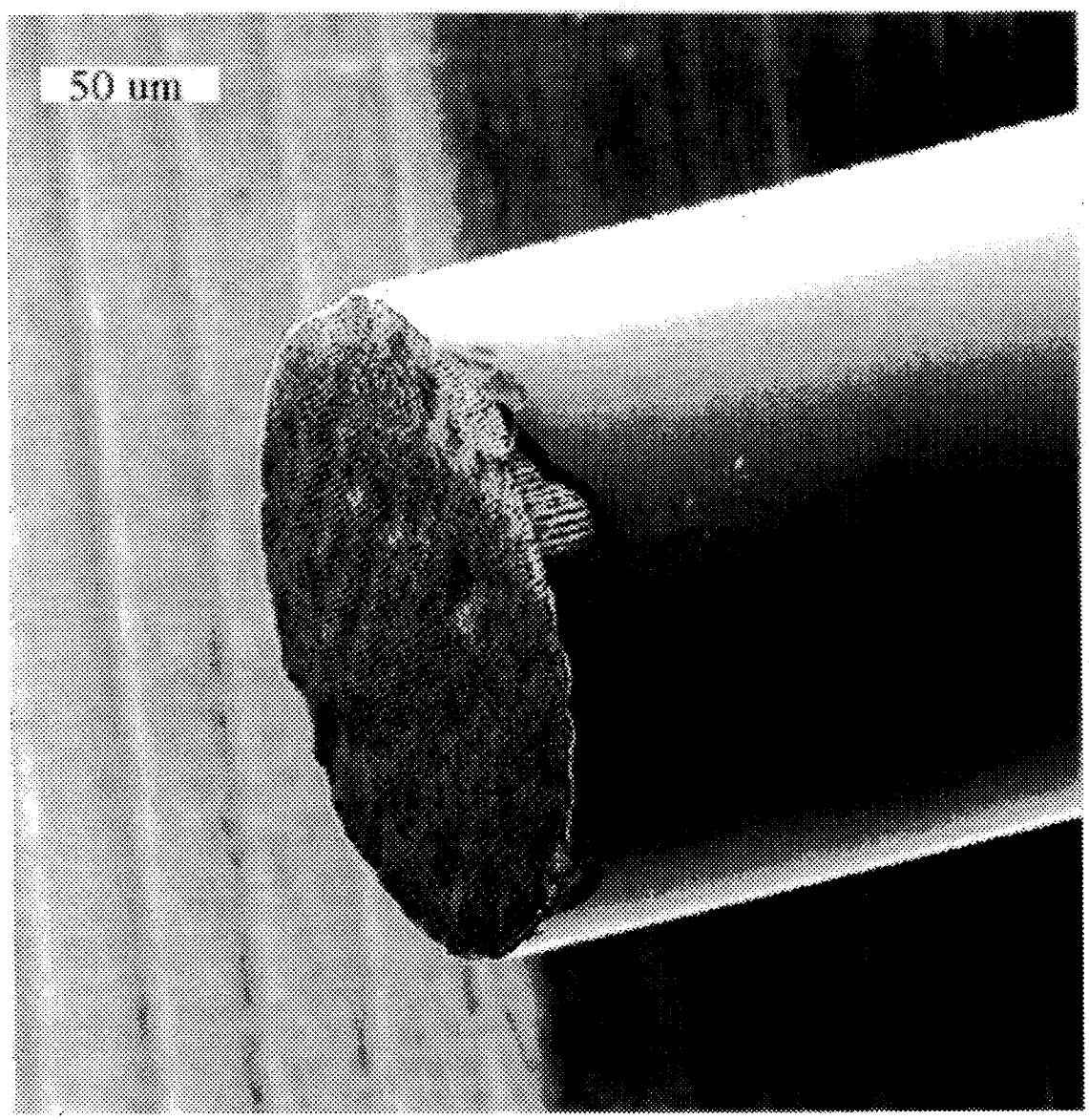
FIG. 8 is a low magnification (200×) scanning electron micrograph of the distal optic array end surface which has been chemically etched and where the silicon resin jacket has been removed.

To illustrate the etching technique and its tapering effect on the distal array end surface of the fiber optic array of FIG. 1, FIGS. 7–10 respectively are provided. FIG. 7 provides a 170× magnification scanning electron micrograph of an optic array end surface which has been chemically etched by buffered hydrofluoric acid and wherein the silicone resin jacket of the array has not been removed prior to etching. In comparison, FIG. 8 shows a 200× magnification scanning electron micrograph of the distal optic array end surface which also has been chemically etched by buffered hydrofluoric acid and where the silicone resin jacket has been removed by acetone. Both the jacketed and non-jacketed formats are available to the ultimate user as a matter of personal choice or convenience.

Figure 9:
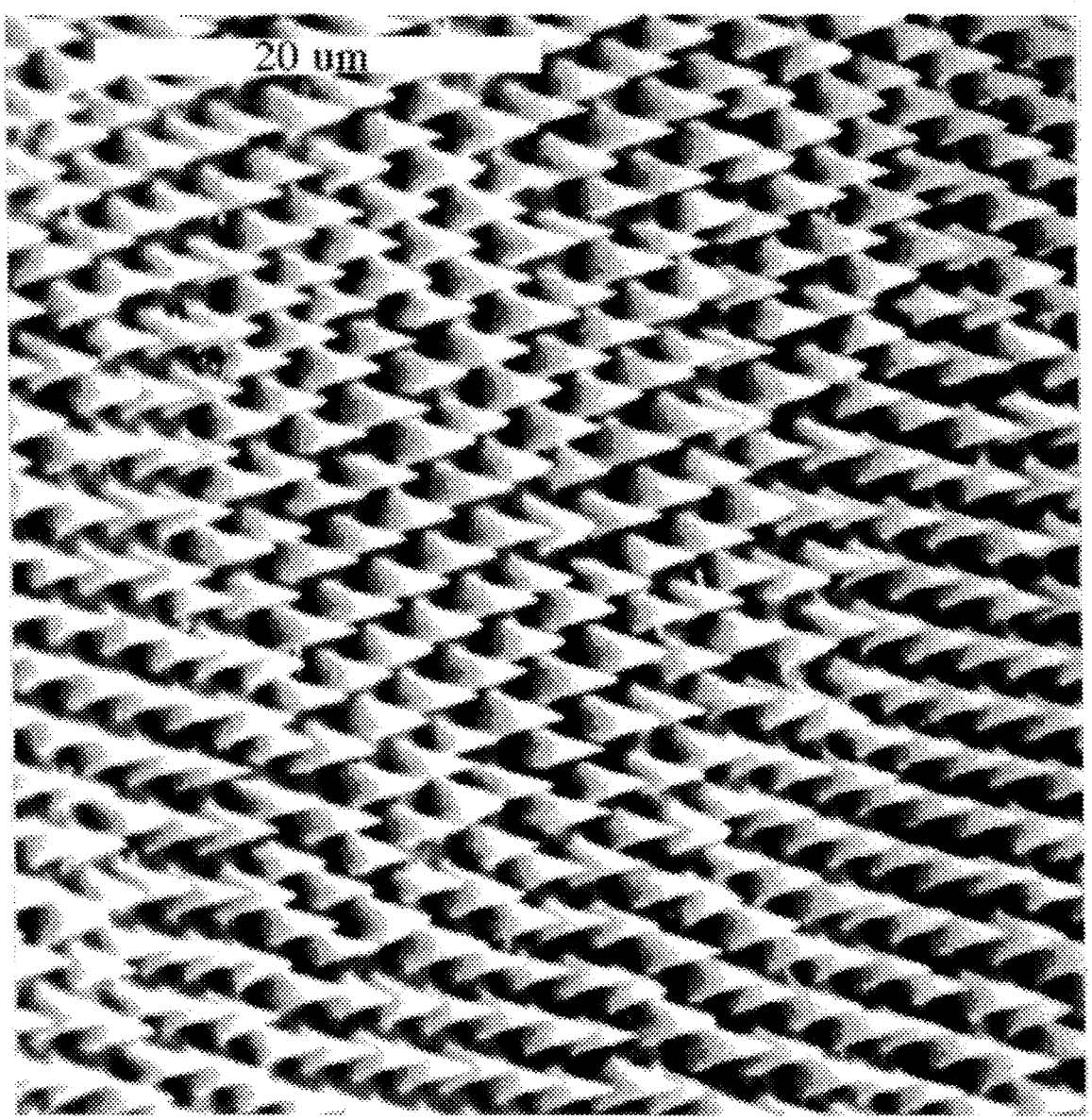
FIG. 9 is a high magnification (1,600×) scanning electron micrograph of a distal optic array end surface which has been chemically etched.

The faceted grid format of the chemically etched optic array end surface is shown in detail by FIG. 9 in which a 1600× magnification scanning electron micrograph of the chemically etched end surface is shown. Note that each sharply tapered strand end appears as a cladless tapered tip end face individually and repeatedly over the entire array end surface. The size scale provided within FIG. 9 also shows that each cladless tapered tip strand end is markedly reduced in size and appears to be about 200–500 nm in diameter.

Figure 10:
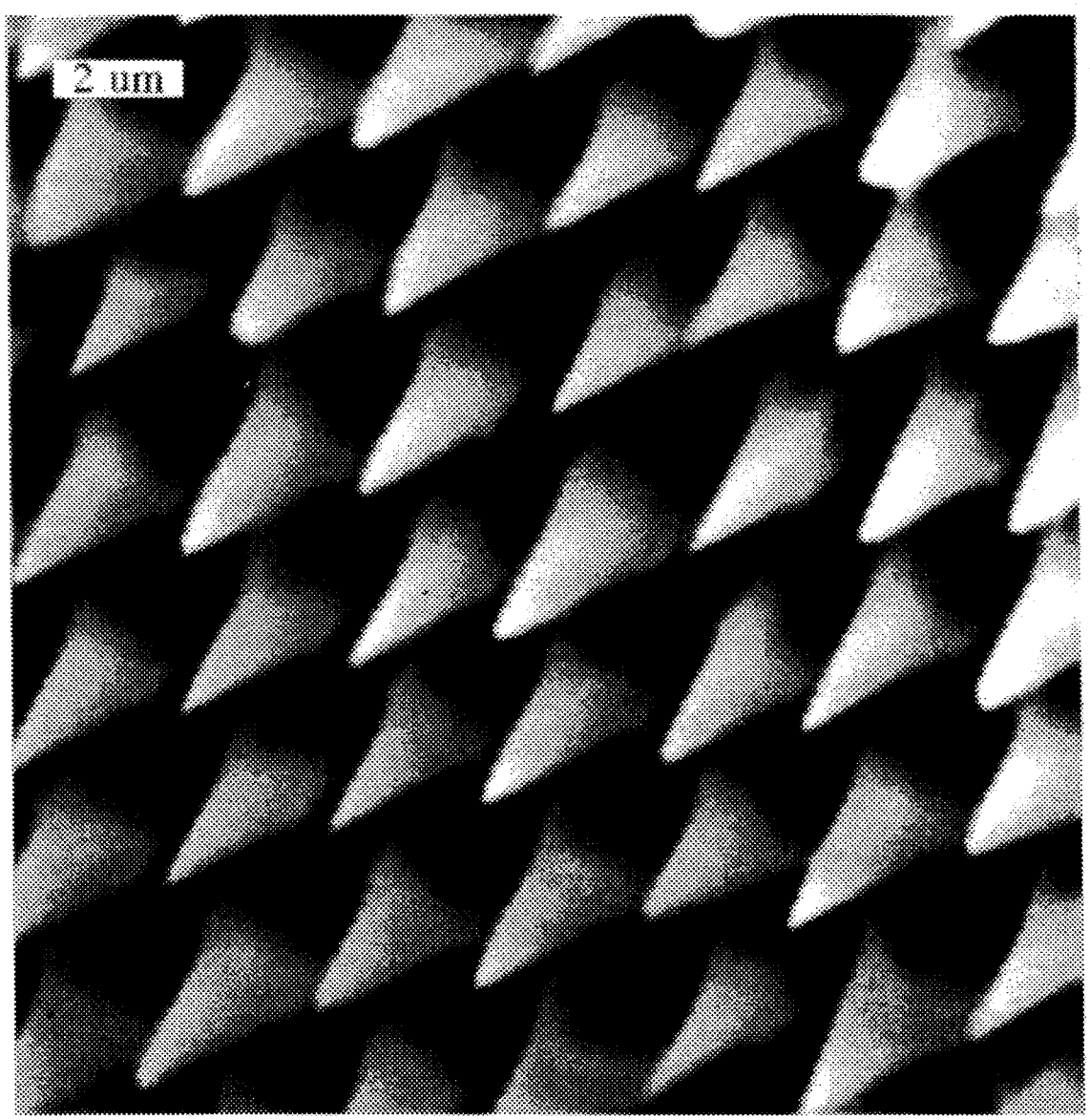
FIG. 10 is a high magnification (5,000×) scanning electron micrograph of a distal optic array end surface which has been chemically etched.
Figure 11:
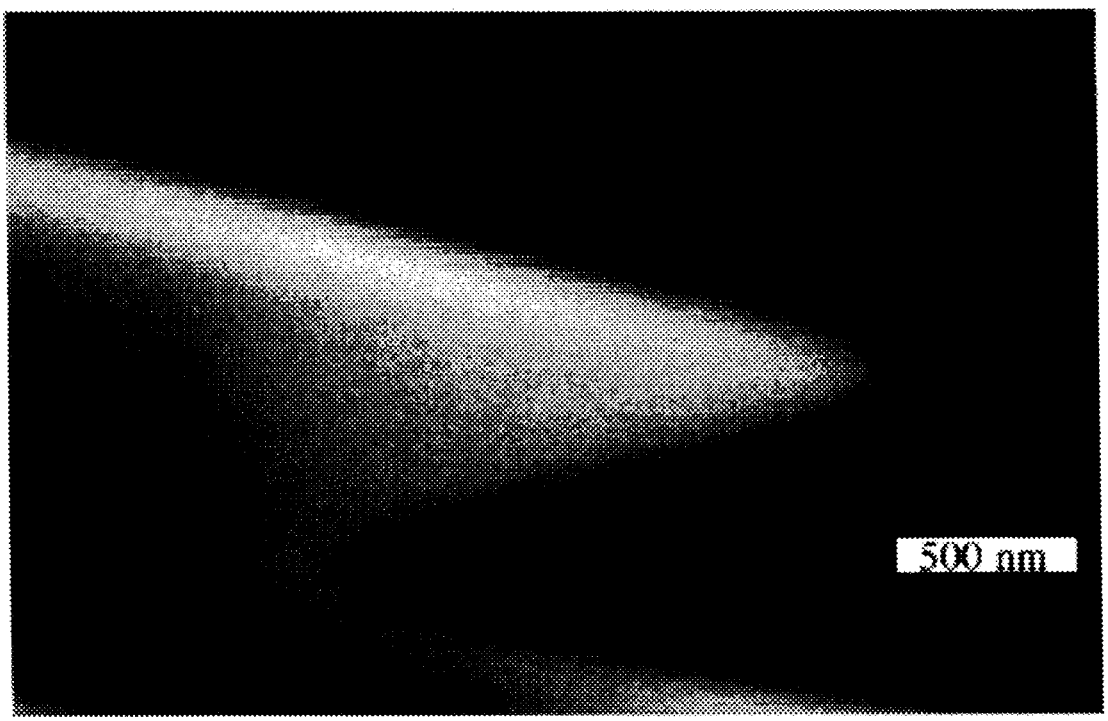
FIG. 11 is a high magnification (30,000×) scanning electron micrograph of a distal optic array end surface which has been chemically etched.

The limited diameter size of each cladless tapered strand end tip fixed in parallel alignment and forming the distal array end surface is shown by FIG. 10 and FIG. 11 respectively. As shown, FIG. 10 is a 5000× magnification scanning electron micrograph of the sharply pointed and cladless, tapered tip end faces of the chemically etched optical fiber strand cores which cumulatively and collectively form the faceted grid optic array end surface at the distal end. A size guide approximation reveals that the cladless, sharply pointed tapered tip end of each optical fiber strand now lies well within a range of 2–1,000 nm.

The diameter size of the cladless, tapered strand end tip is best illustrated by FIG. 11 which shows a 30,000× magnification scanning electron micrograph of a single tapered optical fiber strand end which has been chemically etched to yield a cladless and sharply tapered tip end face for the strand. The size guide provided within FIG. 11 clearly reveals the extraordinarily small diameter of the cladless, tapered tip end for each optical fiber strand at the distal array end surface.

C. The fiber pulling and heating technique and fiber etching technique in combination The preferred method for tapering the "distal" optic array end employs both the pulling and heating method and the etching method together in serial sequence. The fiber pulling and heating procedure described in detail previously herein tapers the strand end faces of the array while maintaining the architecture of the individual strand cores; and the overall diameter of the array end becomes substantially reduced in thickness and tapered at the tip. A typical tapering effect provides more than a 99% reduction—as for example, where the initial overall array diameter was 1,000 µm and the resulting pulled and heated tapered diameter for the array end was only ~5 µm in size.

Consequently, the etching technique and effect on the previously heated and pulled tapered array end will further reduce the thickness of each individual optical fiber strand end as well as further taper the strand end face such that a sharply tapered, pointed strand end tip is produced. The etching techniques will thus yield the faceted grid optic array end previously described herein; and produce tapered tip end faces which are sharply pointed and diminished in size to the range of about 2–1,000 nm in diameter.

The preferred combination of both the pulling/heating technique and the etching procedure together not only provides the benefits and advantages of each tapering process individually, but also offers the manufacturer a far greater degree of tapering control and diameter size selection during the acts of reducing the overall diameter and shaping the optical array end surface into tapered form. In this manner, the desired physical appearance and organizational format for the targeted optic array end will be achieved in a reproducible and reliable process.

III. An Opaque Metal Coating Apertured Overlay

The present invention also demands and requires that an opaque metal coating cover the now tapered "distal" optic array end surface; and, in particular, overlay the cladless, tapered multiple optical fiber strand end faces as a plurality of open-ended opaque metal tubes or cylindrical casings each having a size-limited end aperture ranging from about 2 nanometers to less than about 1,000 nanometers in diameter. The result and consequence of the opaque metal coating and overlay is that the open-ended opaque metal tubes or casings encompass and enclose each cladless tapered strand end face; and provide thereby subwavelength-sized apertures (ranging from about 2–1,000 nanometers) for the generation of a plurality of discrete subwavelength light energy beams concurrently by and through the multiple cladless tapered strand faces of the distal tapered optic array end. Thus, when light energy is introduced to the proximal array surface; is conveyed by the body of the unitary optic array; and is discharged through the multiple cladless tapered strand end faces at the distal tapered optic array end surface, the opaque metal tubular apertures cause the existing light beams to be of subwavelength size and to be in a range from about 2 nm to less than about 1,000 nm in size. In this manner, many discrete subwavelength light beams are concurrently generated and collectively discharged by the tapered optical strand end faces via the opaque metal tubular coatings over the entire distal optic array end surface.

A. The Presence of the Opaque Metal Coating Overlay.

The physical presence and tangible result of overlaying the "distal" tapering optic array end surface generally and the cladless, tapered strand end faces individually is most easily demonstrated by using the sharply pointed, tapered strand end tips of FIGS. 9 and 10 respectively and coating them with an opaque metal overlay. The effect and consequence is shown by FIG. 12.

Figure 12:
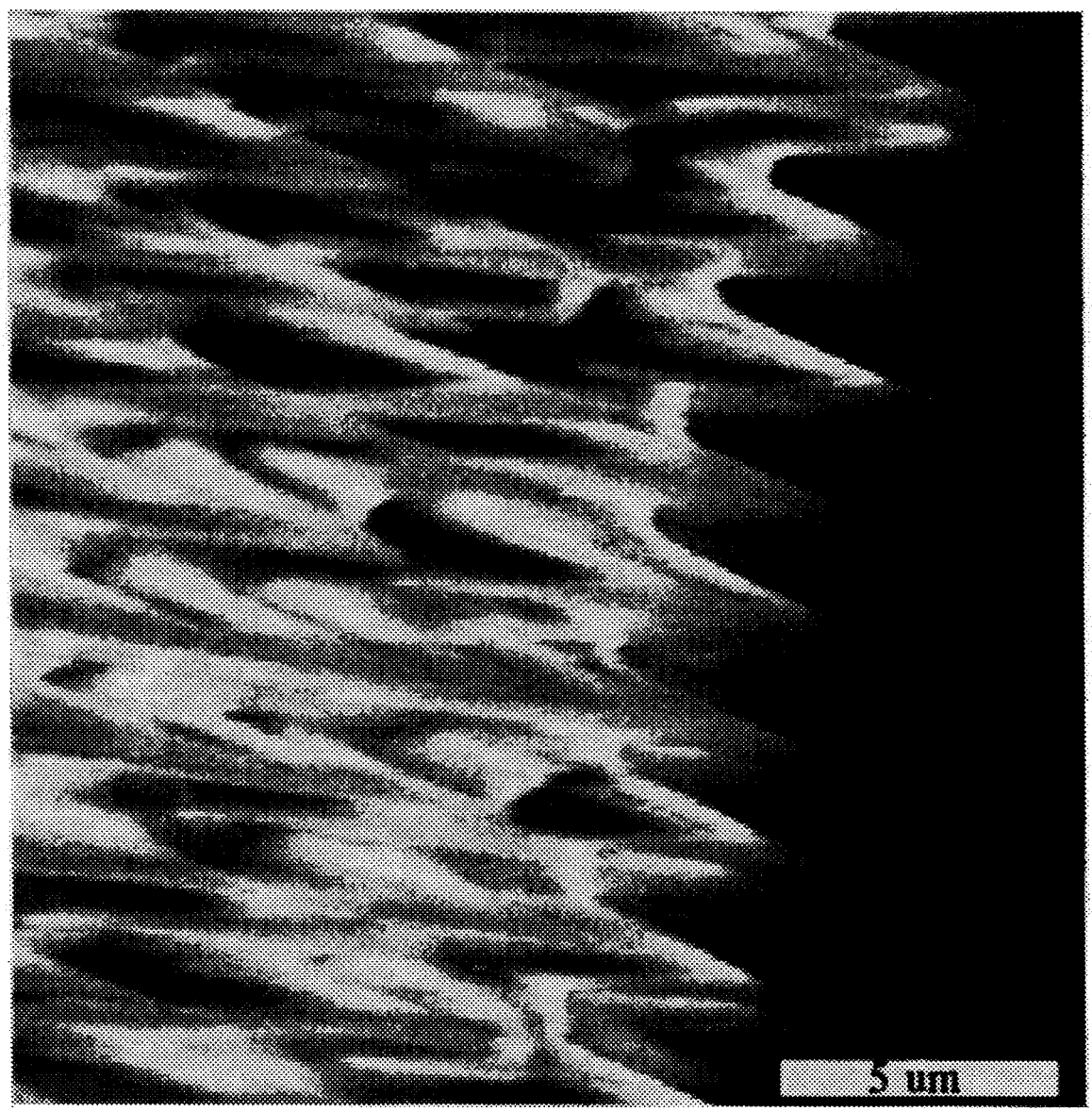
FIG. 12 is a high magnification (3,400×) scanning electron micrograph of a distal optic array end surface which has been chemically etched and coated with a thin layer of aluminum.

It will be recognized that FIG. 12 is a 3,400× magnification electron micrograph of a tapered distal optic array end surface which has been chemically etched to yield sharply pointed tapered strand end tips and subsequently evaporated-coated with a thin layer of aluminum. Note that there was no gold-coating involved in this particular scanning electron microscope analysis and in the taking of this micrograph image. This is a most important point to appreciate because—when any silica-based optical fiber strand or fiber optic array is subjected to the 15 KV electron beam without the prior application of a gold coating, either an image is not obtainable at all and/or the electron beam begins to damage and degrade the substance of the fiber optical strands themselves. Thus, the fact that an electron micrograph image can be acquired for an aluminum-coated chemically etched optical array end surface (as shown in FIG. 12) demonstrated that an uniform and continuous metal overlay extends across the entire distal array end tapered surface; and also that this metal overlay covers the configured side walls of the fiber optic array as a contiguous aluminum coating (to join and merge with the grounded-sample-mounting stub).

In addition, the size guide provided within FIG. 12 reveals the overall size range for the open-ended opaque tubes or metal casings overlaying the tapered strand end faces at the distal array end surface. The achieved result and consequence of the aluminum metal overlay is that the opaque metal tubes encompass and enclose each cladless, tapered strand end face.

B. The positioning of the end aperture of the opaque overlay on the tapered strand end faces It will be recognized and appreciated that the process of overlaying each cladless, tapered strand end face with an opaque metal coating material in order to form an open-ended tube or casing having a size limited end aperture can be achieved using different structural formats and positionings. This can be understood and is most easily demonstrated by using the sharply pointed, tapered strand end tip of FIG. 11 as a prototype and teaching example.

The overlying of the cladless tapered strand end face of FIG. 11 with an opaque metal coating material can result in three different physical positionings for the open-ended opaque metal enclosures subsequently formed, wherein each tubular end aperture is limited in size to the range from about 2 nm to less than about 1,000 nm in diameter. These three positioning formats are illustrated by FIGS. 13, 14 and 15 respectively.

Figure 13:
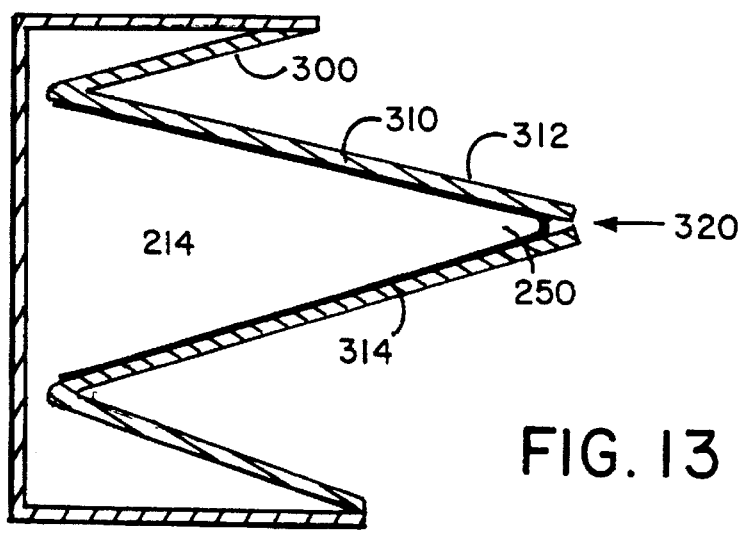
FIG. 13 is a cross-sectioned view of a chemically-etched, tapered optical fiber strand end which has been overlayed with an opaque metal coating in a first alternative positional format.

As seen within FIG. 13 the opaque metal coating material 300 forms a funnel-shaped tube 301 whose cross-sectional sides 312 and 314 extend beyond the sharply pointed tapered tip end 250 and form an extremely narrow diameter aperture 320 (typically in the range from about 2–20 nanometers). Clearly, it is the overall axial length of the open-ended opaque metal tube 310 and the side wall length 312 and 314 which extends markedly beyond the end of the cladless tapered strand tip 250 which allows for the extremely narrow diameter of the aperture 320. If, however, the axial length of the tubular enclosure 310 is reduced during the coating process or shortened after the opaque metal coating material has hardened as a open-ended tube, an alternative positioning and organizational format results.

Figure 14:
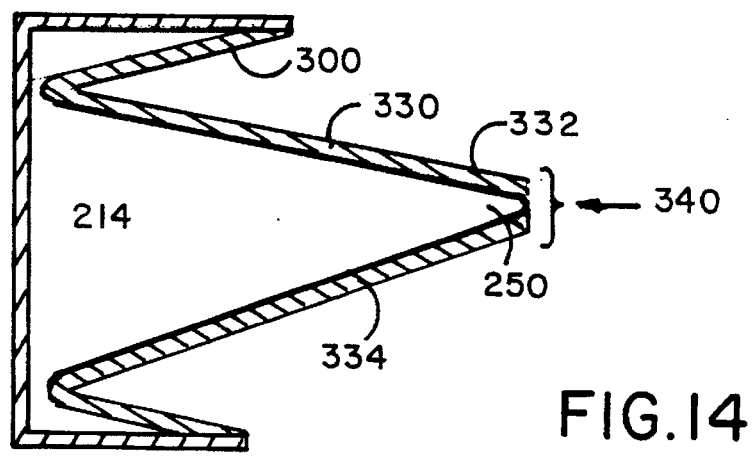
FIG. 14 is a cross-sectioned view of a chemically-etched, tapered optical fiber strand end which has been overlayed with an opaque metal coating in a second alternative positional format.

The shortened opaque metal coating tube 330 is illustrated by FIG. 14 in which the "V"-shaped casing 330 has shortened side walls 332 and 334 which results in an size-limited end aperture 340 which surrounds the parameter of the tapered strand end face 250 and provides an aperture size very similar in diameter to the size of the sharply pointed and cladless, tapered strand end tip 250. In this manner and second positioning format, the aperture size 340 for the opaque metal casing 330 corresponds to and is strikingly similar in size to the diameter of the sharply pointed, tapered strand end face 250; and consequently the of the subwavelength light beam generated is broader (typically between 3–200 nanometers in diameter).

Figure 15:
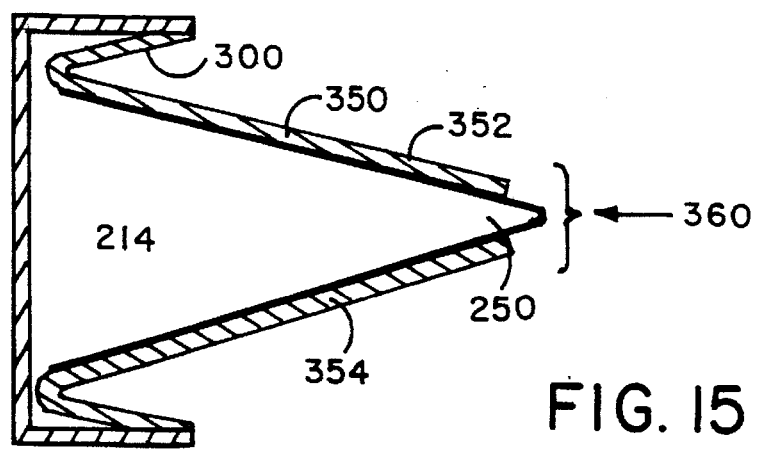
FIG. 15 is a cross-sectioned view of a chemically-etched, tapered optical fiber strand end which has been overlayed with an opaque metal coating in a third alternative positional format.

The third positioning format is illustrated by FIG. 15. As seen therein, the opaque metal coating material 300 forms another cone-shaped hollow overlay 350 and provides an open-ended enclosure with a size limited end aperture within the prescribed size range. In this embodiment, however, the opaque metal side walls 352 and 354 are extremely shod in axial length; and terminate on the tapered strand end 214 short of the cladless and sharply pointed, tapered tip end face 250. Accordingly, in this third instance, the sharply pointed, tapered tip strand end 250 extends through and beyond the opaque metal overlay enclosure 350 and extends through the sized aperture 360 into the ambient environment. As a result of this organizational format and positioning for the opaque metal overlay coating 350, the end aperture 360 is actually greater in overall size than the diameter of the tapered strand end face 250. Thus, while the diameter of the tapered strand end face 250 has remained constant throughout each illustration and embodiment provided by FIGS. 13, 14 and 15 respectively, the size-limited end aperture 360 in this third format is markedly greater in size than the diameter of the tapered strand end face 250 (and typically lies in the range from about 20 to less than about 500 nanometers in diameter).

C. Opaque Metal Coatings and Aperture Formation

Aluminum, chromium, and silver each are suitable for use as opaque metal coatings. Aluminum is the most desirable material to use because it has the highest opacity of all metals across the visible spectrum. Typically, aluminum is evaporated as a thin film greater than 50 nm in depth. This is achieved by placing an aluminum-based target and the tapered strand end surface of the array in a high vacuum chamber and heating the aluminum-based material at low pressure. If a sub-$\lambda/2$-aperture is to be formed, the application of an opaque metal coating that covers the walls of an individual tapered strand end tip (and not the apex of the tip) can be achieved by rotating and shadowing the tip from the evaporating metal target. In other words, when the strand end tip is tilted away from the metal coating source, it is shielded. Of course, if one tilted an array of tapered, cladless strand end tips away from a source of coating metal, each individual tapered strand end tip would prevent the opaque metal coating from covering the walls of neighboring tips. Therefore, formation of size-limited end apertures on each tapered tip of an array typically requires multiple fabrication steps. First, the array of optical tips would be positioned normal to the evaporating metal target such that all cladless, tapered strand end tips would be uniformly coated with aluminum. Second, one of several possible methods to remove the aluminum from the apex of each coated end tip in the array would be employed to create the apertured metal tube coating.

The simplest method to remove aluminum from the apex of each tapered strand end tip in the optic array end would involve deforming the metal coating at the apex by using a piezoelectric device to press the tips of the near-field array against an optically-flat surface. This technique is conventionally known and has been reported in the literature [Pohl, D. W. in *Advanced in Optical and Electron Microscopy*, (Mulvey, T. and C. J. R. Sheppard, editors), Academic Press, 1991, pp. 243–312; Pohl et al., *Appl Phys. Lett.* 44: 651–653 (1984)]. The removal process would be monitored by continuously shining a laser light through the proximal end of the imaging fiber and using an optical microscope equipped with a charge coupled device to look for an array of tiny weak spots of light to be transmitted.

Moreover, other suitable removal processes can involve the following: the lithographic capabilities of a commercial atomic force microscope instrument; a piezoelectric device to lower the tip of the near-field array into a slurry of polishing material; a chemically-assisted (typically a gaseous mixture) polishing procedure; a selective wet chemical etching reaction; and a selective electrochemically-generated reaction (where selective electrochemical etching at the apex would be guaranteed by the increased current density due to spherical diffusion observed at a submicrometer-sized tip) [see for example Datta, M., *Interface* 4: 32–35 (1995)]. Nonetheless, in each of these alternative instances, the actual dimensions of the apertures could be characterized via scanning tunneling microscopy and/or scanning electron microscopy where in both instances the lack of conductivity of the apertures (relative to the portion of each tip covered with the conductive metal coating) would be used to determine the dimensions of the apertures.

IV. An Illustrative Fabrication

A. Silica-Based Fiber Array

The high density, high resolution, silica-based, preformed unitary fiber optic array used in this preferred method was obtained from Sumitomo Electric Industries (Torrance, Calif.) and comprised ~6,000 individually-cladded optical fibers that were arranged coherently in a ~270 µm-internal diameter silica jacket. The walls of this silica jacket were ~15 µm thick and were coated with a ~25 µm-thick layer of silicone resin in order to preserve mechanical strength. As a result, the total diameter of the imaging fiber was ~350 µm. The individual optical fiber cores had a diameter of 2–3 µm and were fabricated from silica ($SiO_2$) doped with $GeO_2$. The lower refractive index cladding material was fabricated from $SiO_2$ doped with fluoride.

B. Selective-Chemical Etching Procedure

In this selective chemical etching procedure, the difference in the etching rates of the $GeO_2$-doped silica core and the fluoride-doped silica clad is exploited by using a buffered hydrofluoric acid etching solution comprising 100 µL of 50% hydrofluoric acid (Fisher Chemical Co.), 100 µL of water, and 500 µL of 40% ammonium fluoride (Aldrich Chemical Co.). [CAUTION: appropriate safety measures should be applied (i.e., protective gloves and clothing, safety glasses, etc.).]

The first step involves successive polishing of the distal and proximal faces of a 350 µm-diameter fiber optic array with 30 µm, 15 µm, 3 µm and 0.3 µm lapping films. Residual polishing material is removed by wiping the faces of the imaging fiber with an acetone-soaked cotton swab and then sonicating in deionized water. The tip of the distal end face of the imaging fiber is then dipped (at a right angle) into the buffered hydrofluoric acid etching solution for a given amount of time (0.5–24 hr). The distal end face of the imaging fiber is then thoroughly rinsed and sonicated in water. Finally, the silicone resin jacket surrounding the distal end face of the array is removed by soaking the array end surface in acetone for 1–2 days.

Analysis of the etched fiber optic array end surface was conducted with a scanning electron microscope. FIG. 7 shows a low magnification electron micrograph of a fiber optic array surface which has been chemically etched before the silicone resin was removed; and FIG. 8 shows a low magnification electron micrograph of a chemically-etched optic array end surface where the silicone resin jacket was removed. If the silicone resin was removed before the etching procedure, the silica jacket would also be etched and thus the 270 µm diameter of the array would be reduced. FIGS. 9–11 show high magnification electron micrographs of a chemically-etched strand array end surface. Notice that the cladding material that surrounds each individual optical fiber has been removed; and that the strand end tips of each optical fiber strand are now tapered with tip diameters on the order of 100–200 nm. Note, that for purposes of acquiring these scanning electron microscope analyses and images, each sample was gold coated. Atomic force microscopic analysis of these arrays (where no gold coating was employed) has demonstrated that the cladless, tapered strand end tip diameters are ≦100 nm

C. Opaque Metal Overlay

Aluminum, as the opaque metal coating material of choice, is then evaporated as a thin film overlay in a depth (or thickness) greater than about 50 nm as is shown by FIG. 12. After the aluminum coating has hardened into a solid continuous overlay, the size-limited aperture within the prescribed range (2–1,000 nm) is formed by removing aluminum metal from the apex of each tapered end tip at the optic array end using a piezoelectric apparatus to process the end tips against an optically flat surface. This results in a deformation of the aluminum metal coating at the apex and creates the size-limited apertures as required.

V. A Detection Apparatus Suitable For Near-Field Viewing And Imaging

It is important to recognize and understand that the present invention and improvement comprising the subject matter as a whole which is the present invention relates solely to the superresolution imaging fiber, its organization, construction and manufacturing requirements. All the details regarding the markedly improved imaging fiber able to generate a plurality of discrete subwavelength light beams concurrently in a manner for markedly improved near-field optical microscopy has been disclosed and detailed previously herein. Nevertheless, after the present invention has been constructed in the described manner, this improved fiber optic array is to be situated and utilized within conventionally known detection apparatus for near-field viewing and imaging of specimens held at subwavelength distances in a conventionally known imaging system. All that follows hereinafter, therefore, is conventionally known information, apparatus, and systems which have been reported in the scientific literature and are commercially sold today in different systematized units.

Figure 16:
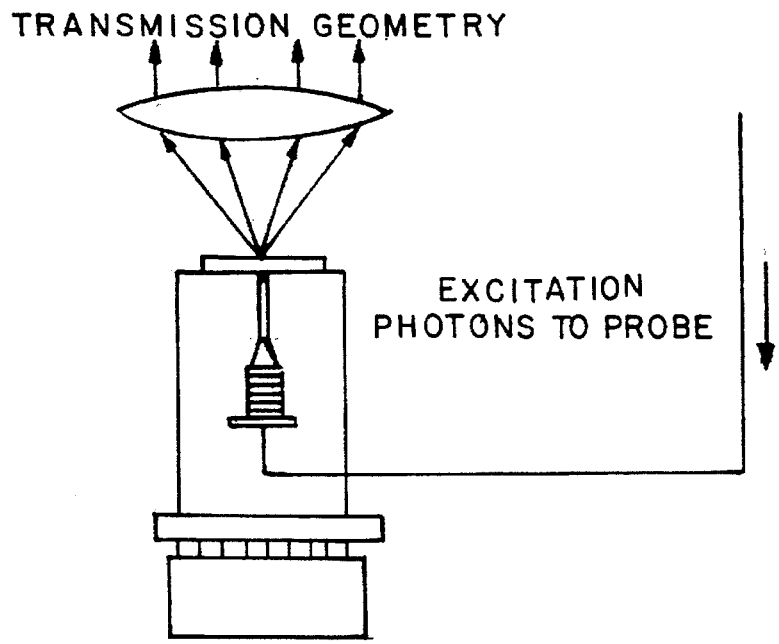
FIG. 16 is a schematic representation of the transmission geometry mode of detection for near-field imaging.
Figure 17:
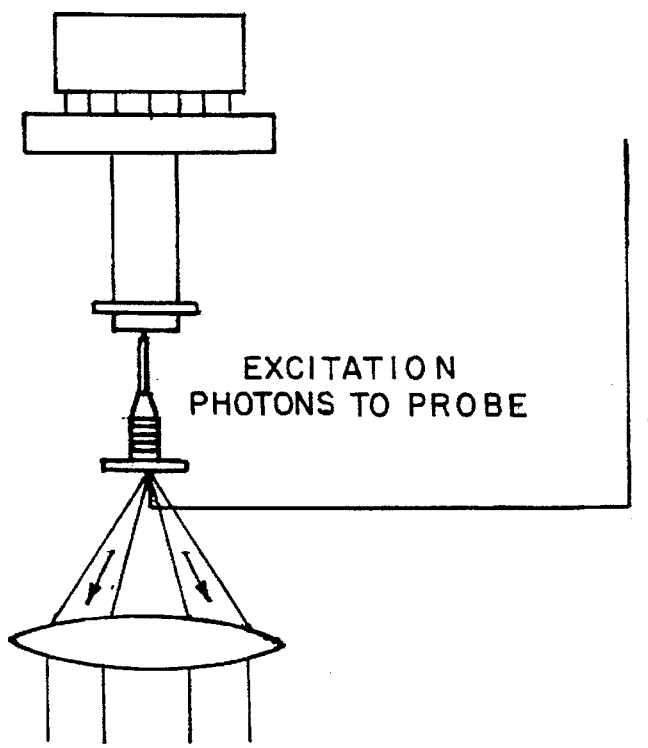
FIG. 17 is a schematic representation of the reflection geometry mode of detection for near-field imaging.

As noted by Harris et al. [*Applied Spectroscopy* 48: 14A–21A (1994)], two general formats for detection purposes are available: transmission geometry detection means and reflection geometry detection means. These are schematically illustrated by FIGS. 16 and 17 respectively. The preferred physical arrangement for detecting a near-field image uses the transmission geometry format in which the subwavelength light energy beams generated concurrently by the imaging fiber comprising the present invention are directed at the surface of a specimen at a fixed subwavelength distance from the distal optic array end surface. The plurality of discrete subwavelength light energy beams generated by the multiple metalized tapered strand end face apertures of the superresolution imaging fiber will strike and pass through the surface of the specimen being examined in the near-field and then pass axially through the thickness of the test specimen for detection by the apparatus illustrated by FIG. 18. It is recognized that maximum collection efficiency for near-field viewing and imaging is obtained using this transmission geometry format. In the alternative, and especially for opaque test specimens (such as semiconductor wafers), the reflection geometry format is required. However, the image collection efficiency is typically reduced by a factor of 2 or more in comparison to the transmission geometry format.

Figure 18:
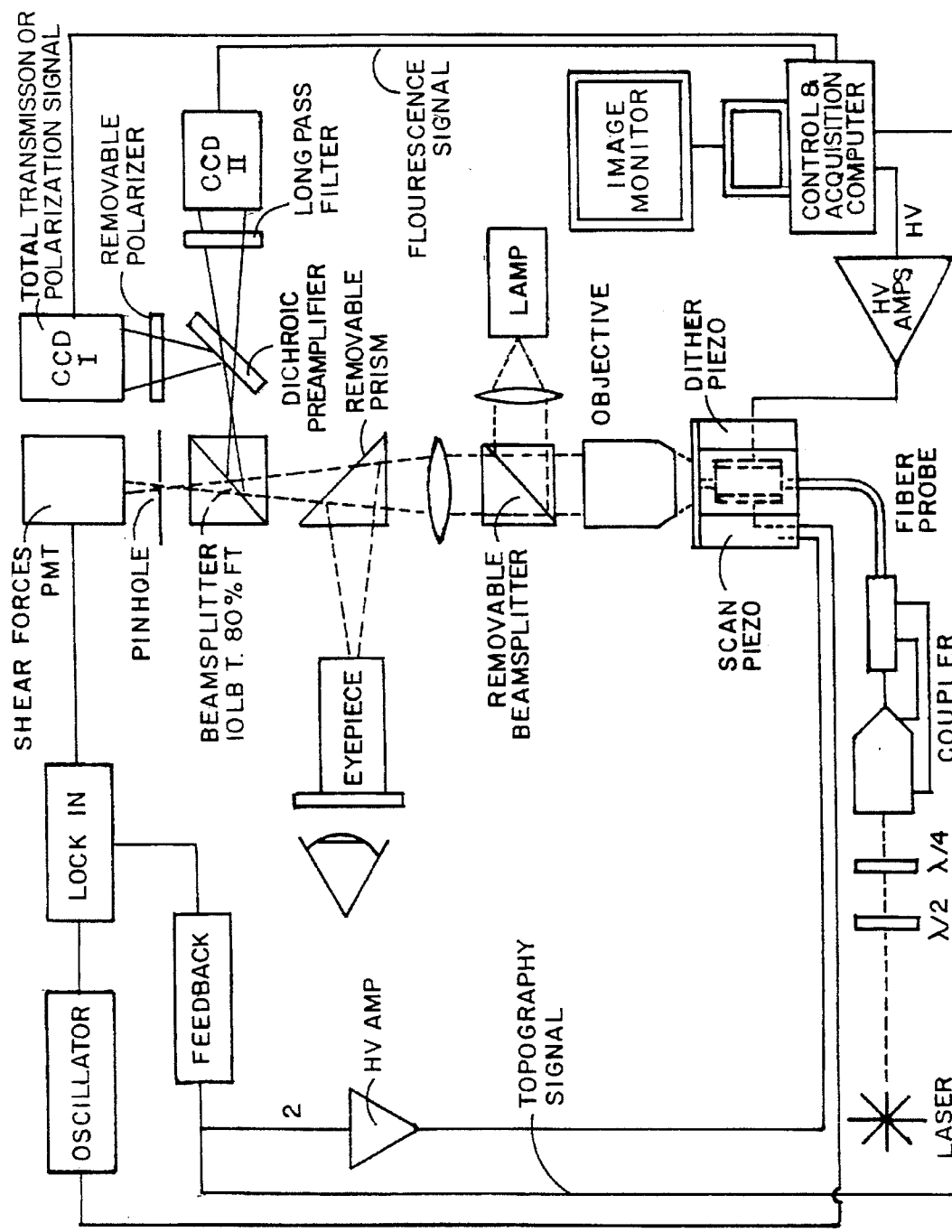
FIG. 18 is a schematic representation of the light energy capturing and computer synchronizing system for generating an image from the near-field environment.

The near-field images of the surface of the specimen being examined in the near-field environment, both in the transmission geometry mode and in the reflection geometry mode, must be captured and electronically enhanced in order to obtain a visual image suitable for use by humans. A typical light beam capturing system is described by Betzig and Trautman [*Science* 257: 189–195 (1992)] and is illustrated by FIG. 18 in schematic detail. As seen within FIG. 18a system instrument is advantageously built around a conventional optical microscope to permit simultaneous low magnification imaging (up to 1,000×) and to facilitate optical manipulation of the detected signal from the near-field environment. After the transmission of subwavelength light beams through the surface of the specimen, the remaining light is collected with an objective lens of the conventional system. The signal is then partitioned to yield simultaneous data from several complementary contrast mechanisms; and a computer is used to synchronize the piezo-electrically generated scanning motion used to obtain the data. This, electrically enhanced and computer synchronized light data results in the formation of an image on an optical monitor which can be viewed directly by the human or reproduced as a photographic image for hard copy preservation.

The invention is not to be restricted in form nor limited in scope except by the claims appended hereto.

What we claim is:

1. A superresolution imaging fiber comprising:
    a preformed, unitary fiber optic array of predetermined configuration and dimensions comprised of a plurality of optical fiber strands disposed co-axially along their lengths and having two discrete optic array ends each formed of multiple optical fiber strand ends and strand end faces, wherein
    (a) the first of said discrete optic array ends is formed of multiple optical fiber strand ends which collectively present a non-tapered, optic array end surface for the introduction and conveyance of light energy, and
    (b) the second of said discrete optic array ends is formed of tapered multiple optical fiber strand ends of reduced thickness each of which presents a tapered strand end face limited in size to a range from about 2 nanometers to about 1,000 nanometers in diameter, said tapered multiple strand end faces collectively presenting a tapered optic array end surface;
    an opaque metal coating covering said second tapered optic array end surface and overlaying said tapered multiple optical fiber strand end faces as a plurality of open-ended opaque metal tubes each having a size-limited end aperture ranging from about 2 nanometers to less than about 1,000 nanometers in diameter.

2. The imaging fiber as recited in claim 1 wherein said tapered strand end faces of said second optic array end surface are limited in size to a diameter range from about 100 nanometers to about 300 nanometers.

3. The imaging fiber as recited in claim 1 wherein said opaque metal coating is aluminum.

4. The imaging fiber as recited in claim 1 wherein said opaque metal coating is one selected from the group consisting of chromium and silver.

5. The imaging fiber as recited in claim 1 wherein said end aperture of said opaque metal tube overlay is in the range from 20–50 nanometers.

6. The imaging fiber as recited in claim 1 wherein said end aperture of said opaque metal tube overlay is in the range from 50–200 nanometers.

7. The imaging fiber as recited in claim 1 wherein said tapered multiple strand end faces of said second discrete optic array end convey and discharge a plurality Of discrete light energy beams concurrently.

8. The imaging fiber as recited in claim 1 wherein said size-limited end apertures of said open-ended opaque metal tube overlays generate a plurality of discrete subwavelength light energy beams concurrently by said multiple tapered strand end faces of said second tapered optic array end.

9. A method for making a superresolution imaging fiber comprising the steps of:
    obtaining a preformed, unitary fiber optic array of predetermined configuration and dimensions comprised of a plurality of optical fiber strands disposed co-axially along their lengths and having two discrete optic array ends each formed of multiple optical fiber strand ends and strand end faces;
    pulling and heating one of said discrete optic array ends to form tapered multiple optical fiber strand ends of reduced thickness each of which presents a tapered strand end face limited in size to a range from about 2 nanometers to about 1,000 nanometers in diameter, said tapered multiple strand end faces collectively presenting a tapered optic array end surface; and
    applying an opaque metal coating over said tapered optic array end surface and as an overlay to said tapered multiple optical fiber strand end faces to form a plurality of open-ended opaque metal tubes each having a size-limited end aperture ranging from about 2 nanometers to less than about 1,000 nanometers in diameter.

10. A method for making a superresolution imaging fiber comprising the steps of:
    obtaining a preformed, unitary fiber optic array of predetermined configuration and dimensions comprised of a plurality of optical fiber strands disposed co-axially along their lengths and having two discrete optic array ends each formed of multiple optical fiber strand ends and strand end faces;
    etching one of said discrete optic array ends to form tapered multiple optical fiber strand ends of reduced thickness each of which presents a tapered strand end face limited in size to a range from about 2 nanometers to about 1,000 nanometers in diameter, said tapered multiple strand end faces collectively presenting a tapered optic array end surface; and
    applying an opaque metal coating over said tapered optic array end surface and as an overlay to said tapered multiple optical fiber strand end faces to form a plurality of open-ended opaque metal tubes each having a size-limited end aperture ranging from about 2 nanometers to less than about 1,000 nanometers in diameter.

11. A method for making a superresolution imaging fiber comprising the steps of:

obtaining a preformed, unitary fiber optic array of predetermined configuration and dimensions comprised of a plurality of optical fiber strands disposed co-axially along their lengths and having two discrete optic array ends each formed of multiple optical fiber strand ends and strand end faces;

pulling and heating one of said discrete optic array end to form tapered multiple optical fiber strand ends of reduced thickness each of which presents a tapered strand end face;

etching said pulled and heated optic array end to form sharply tapered multiple optical fiber end strands each of which presents a sharply tapered end face limited in size to a range from about 2 nanometers to about 1,000 nanometers in diameter, said sharply tapered multiple strand end faces collectively presenting a tapered optic array end surface; and applying an opaque metal coating over said tapered optic array end surface and as an overlay to said sharply tapered multiple optical fiber strand end faces to form a plurality of open-ended opaque metal tubes each having a size-limited end aperture ranging from about 2 nanometers to less than about 1,000 nanometers in diameter.

* * * * *